US009369410B2

(12) United States Patent
Capper et al.

(10) Patent No.: US 9,369,410 B2
(45) Date of Patent: *Jun. 14, 2016

(54) CHATBOTS

(71) Applicant: International Business Machines Corporation, Armonk, NY (US)

(72) Inventors: Liesl Jane Capper, Chippendale (AU); John Zakos, Ashmore (AU); Glenys Anne Westwood McLaughlin, Ryde (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,596

(22) Filed: Jan. 7, 2014

(65) Prior Publication Data
US 2014/0250195 A1    Sep. 4, 2014

Related U.S. Application Data

(63) Continuation of application No. 13/143,887, filed as application No. PCT/AU2009/000023 on Jan. 8, 2009, now Pat. No. 8,630,961.

(51) Int. Cl.
*G06F 17/00*       (2006.01)
*G06F 17/20*       (2006.01)
(Continued)

(52) U.S. Cl.
CPC ............... *H04L 51/02* (2013.01); *G06N 3/004* (2013.01); *G06N 5/02* (2013.01); *G06N 5/04* (2013.01); *G06N 99/005* (2013.01)

(58) Field of Classification Search
None
See application file for complete search history.

(56) References Cited

U.S. PATENT DOCUMENTS 6,570,555 B1 *   5/2003   Prevost et al. ................ 345/156
8,001,250 B2 *   8/2011   Langen et al. ................ 709/227
(Continued)

FOREIGN PATENT DOCUMENTS

AU    2007264420 B8    1/2008
AU    2009335623 B2    7/2010
(Continued)

OTHER PUBLICATIONS

Accessing an Information System by Chatting Bayan Abu Shawar and Eric Atwell School of Computing, University of Leeds, LS2 9JT, Leeds, UK {bshawar, eric}@comp.leeds.ac.uk http://www.comp.leeds.ac.uk/eric/demo.html.*

(Continued)

*Primary Examiner* — Kakali Chaki
*Assistant Examiner* — Ababacar Seck
(74) *Attorney, Agent, or Firm* — Stephen J. Walder, Jr.; Parashos T. Kalaitzis

(57) ABSTRACT

In one aspect, the invention concerns a method of operating a chatbot to engage in a conversation with a correspondent the method comprises building a profile having plural profile variables for the correspondent; and during the conversation with the correspondent; selecting a node in the conversation data structure for processing based on the one or more profile variables, and processing the node to follow a conversation path based on the node's coded instructions and/or relationship with other nodes. In another aspect, the method comprises the steps of attempting to match the conversation data structure of the chatbot; if a matched node is found, selecting the matched node for processing; but if a matched node is not found, selecting a node for processing using a fuzzy search, or using a default procedure.

20 Claims, 20 Drawing Sheets

(51) Int. Cl.
*H04L 12/58* (2006.01)
*G06N 3/00* (2006.01)
*G06N 5/02* (2006.01)
*G06N 99/00* (2010.01)
*G06N 5/04* (2006.01)

(56) References Cited

U.S. PATENT DOCUMENTS

| | | | |
|---|---|---|---|
| 8,311,513 B1 * | 11/2012 | Nasserbakht et al. | 455/410 |
| 8,630,961 B2 | 1/2014 | Beilby et al. | |
| 8,719,200 B2 | 5/2014 | Beilby et al. | |
| 2002/0133347 A1 * | 9/2002 | Schoneburg et al. | 704/257 |
| 2003/0046689 A1 * | 3/2003 | Gaos | 725/34 |
| 2003/0182391 A1 * | 9/2003 | Leber et al. | 709/217 |
| 2004/0162724 A1 * | 8/2004 | Hill et al. | 704/231 |
| 2004/0210661 A1 * | 10/2004 | Thompson | 709/228 |
| 2005/0015350 A1 | 1/2005 | Foderaro | |
| 2006/0069546 A1 | 3/2006 | Rosser et al. | |
| 2006/0150119 A1 * | 7/2006 | Chesnais et al. | 715/810 |
| 2006/0155765 A1 | 7/2006 | Takeuchi et al. | |
| 2007/0203693 A1 | 8/2007 | Estes | |
| 2014/0297568 A1 | 10/2014 | Beilby et al. | |

FOREIGN PATENT DOCUMENTS

| | | |
|---|---|---|
| WO | WO2005/038776 A1 | 4/2005 |
| WO | WO2008/000044 A1 | 1/2008 |
| WO | WO2008/000046 A1 | 1/2008 |
| WO | W2010/078614 A1 | 7/2010 |

OTHER PUBLICATIONS

Subtext: Uncovering the Simplicity of Programming, Jonathan Edwards MIT CSAIL 32 Vassar St. Cambridge, MA 02139 edwards@csail.mit.edu http://subtextual.org OOPSLA'05, Oct. 16-20, 2005, San Diego, California, USA. Copyright 2005 ACM 1-59593-031-0/05/0010 . . . $5.00.*
International Preliminary Report on Patentability dated Feb. 27, 2011, Application No. PCT/AU2009/000023, 54 pages.
International Preliminary Report on Patentability dated May 12, 2008, Application No. PCT/AU2007/000912, 4 pages.
International Search Report and Written Opinion dated Mar. 24, 2009, Application No. PCT/AU2009/000023, 12 pages.
International Search Report and Written Opinion dated Sep. 3, 2007, Application No. PCT/AU2007/000912, 10 pages.
U.S. Appl. No. 13/143,887.
"AI Knowledge Base", SitePal, http://web.archive.org/web/20060427051406/http://www.oddcast.com/sitepal/ai; Apr. 27, 2006, 1 page.
"Superbot—The Easy Way to Create Your Own Custom Bot", A.L.I.C.E Artificial Intelligence Foundation, , http://web.archive.org/web/20060531201617/http://www.alicebot.org/superbot.html; May 31, 2006, 4 pages.
"The Asimov Site", Asimov Software, http://web.archive.org/web/20050418222133/www.sondergaard.clara.co.uk/; Apr. 18, 2004, 3 pages.
"The Source for Artificial Intelligence Chat Bots", The Personality Forge, http://web.archive.org/web/20060615224514/http://www.personalityforge.com; Jun. 15, 2006, 2 pages.
"Your Bot—your personality—your character", jabberwacky.com,. http://web.archive.org/web/20060615042857/http://www.jabberwacky.com/yourbot; Jun. 15, 2006, 2 pages.
Abbattista, F. et al., "Improving the usability of an e-commerce web site through personalization", Proceedings of the AH '2002 Workshop on Recommendation and Personalization in Electronic Commerce, 2nd Int. Conference, May 2002, 10 pages.
Buttazzo, Giorgio, "Artificial Consciousness: Utopia or Real Possibility?", IEEE, http://www.das.ufsc.br/~rabelo/Ensino/DAS6607/Artigos-Gerais/ArtificialConsciousness.pdf, Jul. 2001, pp. 24-30.
Chantarotwong, Bonnie, "The Learning Chatbot", Berkely IMS-256 Final Project, http://courses.ischool.Berkely.edu (Fall 2006), 12 pages.
De Almeida, P. et al., "Interactive conversational character as a virtual tour guide to an online museum exhibition", IEEE Proceedings of the International Conference on Computers in Education, vol. 1, Dec. 3-6, 2002, 9 pages.
Graesser, Arthur C. et al., "Intelligent Tutoring Systems with Conversational Dialogue", In American Association for Artificial Intelligence, http://www.info.2uqam.ca/~nkambou/DIC9340/seances/seance2-3-4-6/Tutoring%20inteaction/AIMag22-04-005.pdf, Winter 2001, pp. 39-52.
Saygin, Ayse P. et al., "Turing Test: 50 Years Later", Minds and Machines, 10: http://crl.ucsd.edu/~saygin/papers/MMTT.pdf; 2001, Nov. 2000, 56 pages.
Shawar, Bayan A. et al., "Chatbots: Are they Really Useful?", LDV-Forum 2007—Band 22(1), p. 29-49.
Vilhjalmsson, Hannes H. et al., "BodyChat: Autonomous Communicative Behaviors in Avatars", In Proceedings of the 2nd Annual ACM International Conference on Autonomous Agents, Minneapolis, http://www.media.mit.edu/gnl/publications/agents98.pdf, May 1998, 15 pages.

* cited by examiner

MyPersonality

Personality Type

Choose a personality which best describes how you are, most of the time:

○ Slightly friendly, but neutral: If you are not sure which personality to pick, or if you want to impose your own personality fully.

○ Warm-hearted, Intellectual: You like to think, to read, to explore. You are a warm-hearted person.

○ Cheeky, Intellectual: You like to think, to read, to explore. You are witty, even acerbic at times.

○ Warm-hearted, Down to Earth: You are warm hearted & practical. Your thinking is down-to-earth rather than complex.

○ Cheeky, Down to Earth: You are cheeky, & dislike people who waste your time. Your thinking is down-to-earth, not abstract.

○ Evil: You are evil and cheeky. You do not care for happiness or do-gooders. You can be mean, but that is to be expected of any evil genius.

Update

Personality Profile

This personality profile shows where you sit along the various personality traits. Hmm, your profile is very interesting indeed!

| Left | Right |
|---|---|
| Looks aren't everything | Attractiveness |
| Fun relationships | Meaningful relationship |
| Modern | Traditional valuer |
| Realist | Spiritual altruist |
| Easy going | Goal directed |
| Down to earth | Intellectually curious |
| Self sufficient | Warm hearted |
| Intense | Stable |
| Spontaneous | Self disciplined |

Please Note
Completing the personality profile questions is not enough to complete creating your CyberTwin! You should make sure to choose a personality type (above) and also submit your content via the MyClassroom page.

| Profile Rules | Properties | Output Node | Related Nodes |

Date Created:   07 Feb 2008

Date Modified:  –

Hits:         88

Last Hits:    0

Links:        0

Dictionary Link                                                    [...]

241
　　Auto learn candidate

✓ Insert joining statement when dynamic node switching

Update

Fig. 10

| Profile Variables | | |
|---|---|---|
| Name | Type | Initial Value |
| Potential home loan cust | Number | 0 |
| Interested in credit card | Number | 0 |
| Potential personal loan | Number | 0 |
| Potential insurance cust | Number | 0 |
| Potential cc bal transfer | Number | 0 |
| Completed application? | Number | 0 |
| Intererested in home loan | Number | 0 |
| Interested in insurance | Number | 0 |
| First home buyer | Yes/No | Yes |
| Refinancing | Yes/No | Yes |
| Investor | Yes/No | Yes |
| Returning | Yes/No | Yes |

242

(Add) (Edit) (Delete) (Find)

(Ok)

(a)

| Profile Report | | |
|---|---|---|
| Client Id | Variable | Value |
| 200176014 | Matched to Default | 1.0 |
| 200176006 | Interest in Gold RWRD | 2.0 |
| 200176004 | Interest in Gold Reward | 0.5 |
| 200176004 | Interest Veloc. Gold | 0.5 |
| 200176004 | Interest in Velocity RWRD | 0.25 |
| 200176004 | Values Velocity | 0.25 |
| 200176004 | Values rewards | 1.0 |
| 200176004 | Interest in credit card | 1.0 |
| 200175986 | Interest in FlyBuys RWRD | 2.0 |
| 200175986 | Interest in Gold Reward | 1.0 |
| 200175986 | Interest in Standard | 0.25 |
| 200175986 | Values FlyBuys | 0.25 |
| 200175986 | Interest Low Rate Visa | 0.25 |
| 200175986 | Values int-free days | 0.25 |
| 200175986 | Values low int rate | 0.25 |
| 200175986 | Values low ann fee | 1.0 |
| 200175985 | Matched to Default | 1.0 |
| 200175957 | Interest in credit card | 3.0 |
| 200175982 | Interest in credit card | 1.0 |
| 200175981 | Interest in Gold RWRD | 1.0 |

MyClassroom

Participate in lessons (below) to make your CyberTwin more intelligent and sound more like you! Teach it how to respond to specific inputs and give it examples of things it should say.

Lessons

| Standard Lessons | | Special Lessons | |
|---|---|---|---|
| Name | # Items Taught | Name | # Items Taught |
| Greetings | 23 of 23 (100%) | MyIntros | 2 |
| All About Me | 30 of 36 (83.3%) | MyFAQs | 5 |
| Change The Subject | 13 of 13 (100%) | MyThoughts | 6 |
| Family | 9 of 9 (100%) | MyQuestions | 4 |
| Love and Friendship | 18 of 22 (81.8%) | MyTags | 2 |
| Entertainment | 4 of 24 (16.7%) | MyKnowledge | 429 |
| Emotion | 9 of 16 (56.2%) | MyText | 1 |
| Humor | 0 of 8 (0%) | | |
| Politics | 0 of 8 (0%) | | |
| Religion | 0 of 10 (0%) | | |
| Philosophy | 0 of 6 (0%) | | |
| Sex | 10 of 17 (58.8%) | | |
| Explicit Sex | 0 of 18 (0%) | | |
| Compliments | 10 of 10 (100%) | | |
| Insults | 9 of 28 (32.1%) | | |
| Explicit insults | 0 of 15 (0%) | | |
| Gender | 0 of 3 (0%) | | |
| Drugs | 0 of 8 (0%) | | |

☐ Chat Stats

Chat statistics give you interesting and insightful information on the spread of time and messages associated with the conversations your CyberTwin has had. Enter the date range for conversations for which you want to calculate statistics for, and click the 'Go' button.

Date From [20080101]     Date To [20081001]     [Go]
(YYYYMMDD)               (YYYYMMDD)

☐ Results

| # Chats | | |
|---|---|---|
| Total | 120 | |
| Engaging | 66 | (55%) |
| Non-Engaging | 54 | (45%) |

Note: The following stats are calculated based only on the engaging chats.

| # Minutes | |
|---|---|
| Avg | 17.2 |
| Min | 1 |
| Max | 825 |
| Total | 1137 |
| % 1-5 | 71.2% |
| % 6-20 | 22.7% |
| % 21-60 | 4.5% |
| % 61+ | 1.5% |

| # Messages | |
|---|---|
| Avg | 10.7 |
| Min | 3 |
| Max | 34 |
| Total | 705 |
| % 1-5 | 31.8% |
| % 6-20 | 57.6% |
| % 21-60 | 10.6% |
| % 61+ | 0% |

Fig. 18(a)

User Input Stats

User Input statistics give you interesting and insightful information on what people are saying to your CyberTwin. Enter the date range for conversations for which you want to calculate statistics for, and click the 'Go' button.

Date From 20080101   Date To 20081001   Go
(YYYYMMDD)           (YYYYMMDD)

Results

User Inputs
Total    262
Unique   139

| Rank | User Input | Hits | % |
|---|---|---|---|
| 1 | which credit card best suits my needs? | 18 | 6.9 |
| 2 | over time | 17 | 6.5 |
| 3 | what credit cards do you have? | 13 | 5 |
| 4 | no annual fee | 10 | 3.8 |
| 5 | i want a credit card | 9 | 3.4 |
| 6 | i would like to apply for a credit card | 8 | 3.1 |
| 7 | rewards | 6 | 2.3 |
| 8 | what credit cards do you offer | 6 | 2.3 |
| 9 | i plan to pay it off over time | 4 | 1.5 |
| 10 | i want a card | 4 | 1.5 |
| 11 | none of the above | 4 | 1.5 |
| 12 | yes | 4 | 1.5 |
| 13 | hi | 3 | 1.1 |
| 14 | i am a first home buyer | 3 | 1.1 |
| 15 | i plan to pay it off at the end of each month | 3 | 1.1 |
| 16 | i would like to enquire about a home loan | 3 | 1.1 |
| 17 | tell me about your credit cards | 3 | 1.1 |
| 18 | what credit cards do you have | 3 | 1.1 |
| 19 | what is the interest rate on your credit cards? | 3 | 1.1 |
| 20 | which credit card best suits my needs | 3 | 1.1 |
| 21 | why would i want a credit card? | 3 | 1.1 |

Fig. 18 (b)

CHATBOTS

CROSS-REFERENCE TO RELATED APPLICATIONS

The present application is related to PCT Application Nos. PCT/AU2007/000912 and PCT/AU2007/000916, the content of which is incorporated herein by reference.

TECHNICAL FIELD

This invention concerns chatbots, that is computer agents designed to have conversations with human correspondents. In particular, this invention concerns a method of operating a chatbot to engage in a conversation with a correspondent, a method of building a chatbot, a chatbot, and a chatbot system. In another aspect, this invention concerns software for implementing the methods.

BACKGROUND ART

Chatbots are becoming increasingly popular as an interesting and interactive medium for the provision of information. In a simple example, a chatbot may replace a text based FAQ (frequently asked questions) facility on a web site. FAQ facilities generally provide a list of frequently asked questions and invite a correspondent to select one of them. Then the correspondent is automatically presented an answer. While this serves the purpose of conveying information, it is dull.

By contrast a chatbot provides a conversational experience for interaction with correspondents. The correspondent can type a question and the chatbot will attempt to interpret it, and then provide an answer. In the context of the FAQ facility, if the correspondent submits one of the frequently asked questions using words the same as or similar to the question, typically the chatbot will provide the prepared text answer; exactly like the text-based facility but in the context of chat.

Most previous chatbots operate in this way. The answer they present is a simple answer to a known question. If the question is unknown, the chatbot simply offers a list of FAQ, and invites the correspondent to select one. A significant problem with the use of most chatbots is the time it takes to program one. It typically takes months of programming and many hundreds of thousands of dollars for a user to create a workable chatbot.

SUMMARY OF THE INVENTION

In a first aspect, the invention concerns a method of operating a chatbot to engage in a conversation with a correspondent,
the chatbot having a conversation data structure comprising plural conversation paths, each path comprised of nodes each having coded instructions and/or relationships with other nodes;
the method comprising:
receiving one or more input messages from the correspondent;
based on the one or more received input messages, building a profile having plural profile variables for the correspondent; and
during the conversation or a future conversation with the correspondent, selecting a node in the conversation data structure for processing based on the one or more profile variables, and processing the node to follow a conversation path based on the node's coded instructions and/or relationship with other nodes.

Using this invention, profile variables can be created that enable the chatbot owner to better personalise a conversation to assess the correspondent as, for example, a potential credit customer, a potential employee, etc. The information gathered about the correspondent can be combined with other sources of information and interpreted using assessment tools to produce, for example, a report on the correspondent's credit behaviour for the purposes of a credit risk management assessment, or a report on the suitability of the correspondent for a particular job.

The step of creating a profile may include updating the value of a profile variable of the correspondent when a node is processed, that node being coded with instructions to update the profile variable based on a profile update rule. The step of selecting a node for processing based on the one or more profile variables may include checking the one or more profile variables against respective pre-determined values.

A profile variable may characterise one or more of: content of the conversation; the correspondent's interest, personality and demographic; one or more nodes processed in the conversation with the correspondent; received input messages, a process started or completed by the correspondent and an activity external to the conversation.

Further, the method may comprise analysing a set of plural profile variables in a correspondent's profile, and generating a report on the characteristics of the correspondent based on the analysis.

A received input message may be an explicit statement or unstructured content or activity, either in textual or non-textual form.

The method may further comprise customising delivery of information to the correspondent based on the correspondent's profile, wherein one or more of the following is customised: content, layout, presentation, format, robot action and source of the information. Customising delivery of information may be based on data extracted from a customer management system.

The method may further comprise performing an assessment on one or more of the correspondent's profile and an external source, and reporting the result of the assessment.

In a second aspect, the invention concerns a method of operating a chatbot to engage in a conversation with a correspondent,
the chatbot comprising a conversation data structure comprising plural conversation paths, each path comprised of nodes each having coded instructions and/or relationships with other nodes;
the method comprising:
receiving an input message from the correspondent;
attempting to match the received input message with a node in the conversation data structure of the chatbot;
if a matched node is found, selecting the matched node for processing;
but if a matched node is not found, selecting a node for processing using a fuzzy search, or using a default procedure; and
processing the selected node to follow a conversation path based on the selected node's coded instructions and/or relationship with other nodes.

The fuzzy search may comprise determining one or more nodes in the conversation data structure that are approximate matches to the received input message; displaying the one or more output messages that are each associated with a nod; to the correspondent; and if the correspondent chooses one of the displayed messages, selecting the node associated with the chosen message for processing. The received input message may then be recorded as a variation to a known input message that matches the node chosen by the correspondent.

The default procedure may comprise selecting a default node in the conversation data structure for processing, and is only performed if no nodes are selected using the fuzzy search.

The step of matching, the received input message with a node in the conversation data to structure, or the fuzzy search, or both, may be based on a profile variable associated with the correspondent.

During the conversation, the received input message or an output message from the chatbot to the correspondent is in textual or non-textual form.

The method may further comprise analysing the received input message to determine a value for the profile variable associated with the correspondent.

The step of matching the received input message with a node in the conversation data structure may involve comparing the received input message with variations associated with that node until a matched variation is found. In this case, the variations are either default variations or variations generated based on past conversations.

The step of matching the received input message with a node may further comprise the steps of translating the received input message into a compatible format using one or more internal translation dictionaries, and comparing the translated message with the nodes in the conversation data structure. Matching the received input message with a node may be based on the length of the input message.

If the received input message is the correspondent's interaction with a webpage, the method may further comprise automatically presenting one or more output messages to the correspondent based on the interaction.

The method may further comprise producing a report on conversations with one or more correspondents, the report including properties of a profile variable associated with one or more correspondents.

The step of processing the selected node comprises performing one or more of the following:
  receiving an input message from the correspondent;
  checking one or more groups of nodes;
  displaying an output message to the correspondent;
  displaying to the correspondent a node which is related to another node that is being displayed;
  determining whether a profile variable satisfies a predetermined condition for a particular correspondent, and if so, processing the node;
  redirecting to a specific node in the conversation data structure and processing the node;
  displaying an output message from a base personality associated with the chatbot;
  randomly selecting a node related to the selected node and processing the node;
  and processing the top child node extending from the selected node and processing the top child node.

In a third aspect, the invention is a chatbot, comprising:
  a conversation data structure; and
  an interpretation engine that navigates the conversation data structure to engage in a conversation with a correspondent; wherein the conversation data structure comprises plural conversation paths, each path comprised of nodes each having coded instructions and/or relationships with other nodes;
  and wherein the interpretation engine is operable to:
    receive an input message from the correspondent;
    attempt to match the received input message with a node in the conversation data structure of the chatbot;
    if a matched node is found, select the matched node for processing;
    but if a matched node is not found, select a node for processing using a fuzzy search, or using a default procedure; and
    process the selected node to follow a conversation path based on the selected node's coded instructions and/or relationship with other nodes.

In a fourth aspect, the invention is a method of building a chatbot, comprising:
  receiving one or more training material; and
  automatically building a conversation data structure of the chatbot according to the received training material, the conversation data structure comprising nodes forming conversation paths, each node having coded instructions and/or relationships with other nodes;
  and wherein, when the chatbot is in use to engage in a conversation with a correspondent, one or more nodes in the conversation data structure are selectable for processing according to their coded instructions and/or relationship with other node or nodes.

Using the invention, a chatbot can be created rapidly and easily without requiring any programming skills on the part of its designer. The conversation data structure provides a visual representation of possible conversations between the chatbot and correspondents and can be constructed to have long conditional conversation paths and to control the flow of a conversation.

Building the conversation data structure may comprise coding and/or linking plural nodes associated with a conversation path to perform one of asking a series of questions to identify a correspondent's interests and intentions; using a profile variable to select a node in the conversation data structure for processing; and directing a correspondent down a conversation path to achieve a desired outcome.

The method may further comprise coding plural nodes to update each a profile variable for a correspondent according to a profile update rule, wherein the training material sets out a list of profile variables and rules for updating them.

The training material may be stored in a central repository accessible by plural users to each build a chatbot. The training material may be one of: a set of questions and responses; a set of questions and responses, ranked and grouped according to importance; variations of a set of questions and answers; a base personality with pre-trained responses; information that are specific to an industry or interest topic, such as with or without pre-trained responses; a set of profile variables; a conversation data structure, or part of, associated with another chatbot; a text file describing a complex conversation data structure; and a set of questions from a centralised dictionary of questions.

A node may be coded with instructions to perform one of the following:
  receive an input message from the correspondent;
  check one or more groups of nodes;
  display an output message to the correspondent;
  display to the correspondent a node which is related to another node that is being displayed;
  determine whether a profile variable satisfies a predetermined condition for a particular correspondent, and if so, processing the node;
  redirect to a specific node in the conversation data structure and select that node for processing;
  display an output message from a base personality associated with the chatbot;

randomly select a node for processing;
and select a top child node extending from the node for processing.

The method may further comprise providing a drag-and-drop to allow manual addition, deletion and editing of a node in the conversation data structure and to code the node with instructions and to link the node to another node.

The method may further comprise generating a knowledge association dictionary that defines key relationships of terms and concepts in the training material, the dictionary being updatable in real-time when the chatbot is operated to engage in a conversation with a correspondent. In this case, the training material comprises one or more of a set of frequently-asked questions and answers, a conversation data structure, and input messages from a correspondent received during a conversation. The knowledge association dictionary may be shared among, and updatable by, multiple chatbots.

The method may further comprise automatically generating one or more variations to a known input message that can be matched to a node based on the training material. This step may be based the generated knowledge association dictionary.

If a knowledge association dictionary is generated, the method may further comprise;
generating a searchable index depicting relationships and/or meaning of a training material in the form of unstructured text; and
during a conversation with a correspondent, searching the index in real time to learn one or more variations to a known input message that can be matched to a node and updating the knowledge association dictionary with the learned variation or variations.

In this case, the unstructured text may comprise one or more of web pages, emails, web feeds, chat transcripts, data on a computer hard disk books.

In a fifth aspect, the invention is a method of operating a chatbot to engage in a conversation with a correspondent,
the chatbot having a conversation data structure comprising plural conversation paths, each path comprised of nodes each having coded instructions and/or relationships with other nodes;
the method comprising
receiving an input message from the correspondent;
based on the received input message, selecting a first node in the conversation data structure for processing according to the node's coded instructions and/or relationships with other nodes;
determining whether the selected node and/or the received input message satisfies one or more predetermined criteria;
and if the determination is not in the affirmative, automatically selecting a second node from a list of nodes that have been previously processed during the conversation for processing.

Advantageously, this dynamic node resolution feature gives the chatbot flexibility to dynamically switch between nodes or conversation paths in the conversation data structure.

The predetermined criteria may be whether the received input message answers a question asked by the chatbot, in which case the selected second node is coded with instructions to ask the correspondent the same question. In another example, the predetermined criteria may be whether the selected node is coded with instructions to process another node, in which case the selected second node is a previously processed node in a conversation path different to that of the first node.

In a sixth aspect, the invention is a chatbot system comprising
a database to store one or more chatbots having a conversation data structure comprising plural conversation paths, each path comprised of nodes each having coded instructions and/or relationships with other nodes; and
a professor to operate one or more chatbots stored in the database to each engage in a conversation with a correspondent according to any one of the above methods.

In a further aspect, the invention is software for implementing the methods.

BRIEF DESCRIPTION OF THE DRAWINGS

Non-limiting examples of the invention will now be described with reference to the accompanying drawings, in which:

FIG. 3 is a screenshot of a base personality selection View.
FIG. 6 is a screenshot of a User Input View.
FIG. 10 is a screenshot of a Properties View.
FIG. 11(a) is a screenshot of an interface for designing Profile Variables.
FIG. 11(b) is a screenshot of a Profile Report.
FIGS. 13(a) and 13(b) are screenshots of a classroom interface.
FIG. 18(a) is a screenshot of a chat statistics reporting interface.
FIG. 18(b) is a screenshot of a user input statistics reporting interface.

BEST MODES OF THE INVENTION

Figure 1:
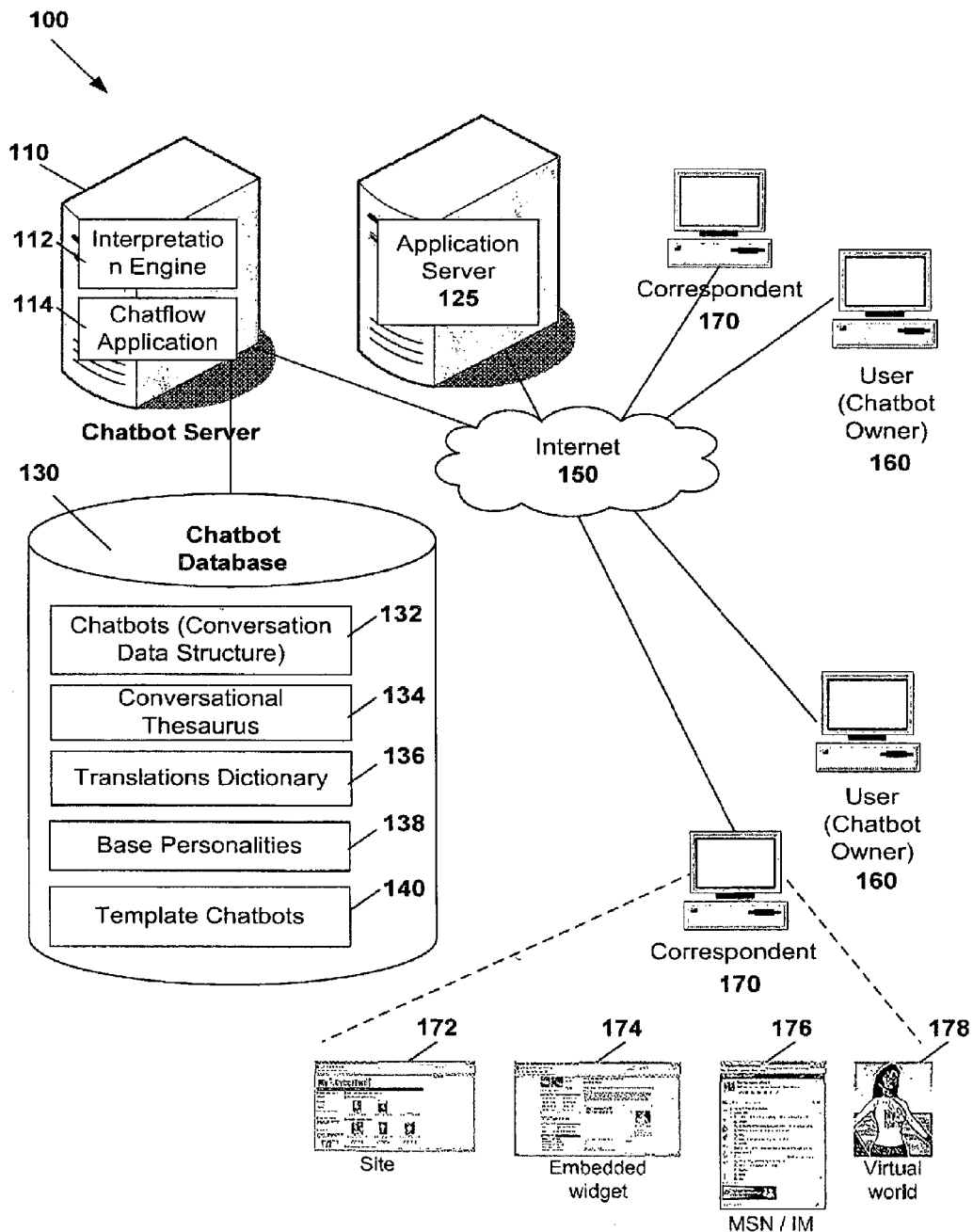
FIG. 1 is a block diagram of a system exemplifying the invention.

Referring first to FIG. 1, the system (100) comprises a chatbot server (110) and database (130) in communication with a plurality of users (160) and correspondents (170) over the Internet (150) only two shown here for simplicity. The users (160) are chatbot owners who create and manage chatbots using a chatflow application (114) provided by the chatbot server (110). The user (160) may be a natural person or a corporation.

The behaviour of a chatbot is defined by user-generated knowledge in the form of a conversation data structure and, optionally, a pre-trained base personality linked to the chatflow application (114) and a knowledge association dictionary. During a conversation with a correspondent (170), the interpretation engine (112) on the chatbot server (110) is operable to navigate the conversation data structure to interact with the correspondent (170).

A chatbot can be deployed and integrated into any online environments, such as webpages (172), intranets, widgets (174), instant messaging applications (176), avatars in virtual world (178), robots and games. This is made possible by the HTTP-based application programming interface (API) that makes the chatbot's core chat functionality available to third party applications.

A chatbot can also be deployed and integrated into any environment where an input message is given, including; vehicles (e.g. depressing the accelerator; the fuel level dropping below a specific level); machines (e.g. turning a machine on; selecting a function to be performed); buildings (e.g. opening a door; turning on a light; speaking to request adjustments to lighting and temperature control) and mobile devices including phones and satellite navigation devices (e.g. requesting a phone number requesting directions), Chatflow Application 114—Designing a Chatbot Referring now to FIG. 2, the interface of the chatflow application (114) provides a visual interface (200) for a user (160) to design a chatbot without having to write lines of codes. In this example, the chatbot is designed to answer enquiries on banking products such as credit cards, home loans and insurance, and also to suggest suitable products based on a conversation with correspondent. The left hand pane of the visual interface (200) shows a conversation data structure (204) which encodes the knowledge and decision making capabilities of the chatbot.

A user (160) does not require any programming skills to be able to use the advanced interface of the chatflow application (114). Instead, the user (160) merely has to add nodes to create a conversation data structure, using one or more of the following methods.

- Drag and drop nodes from the toolbar (202) on the very left hand side of the tool or using the "Node" menu on the top menu bar (203). The toolbar (202) provides a number of "drag-and-drop" and "cut-and-paste" features which allow a node to be added, deleted, edited and copied easily;
- Import question and answer pairs and conversation paths from a from text file. The "Node" menu on the top menu bar (203) provides a facility for importing content from an appropriately-formatted text file and automatically converting the content into nodes in the conversation data structure;
- Import nodes from another chatbot. The "Node" menu (203) provides a facility for importing nodes from another chatbot accessible by the chatbot user;
- Import from a centralised dictionary, Conversational Thesaurus (134). The "Node" menu (203) provides a facility for importing nodes questions from a dictionary ("Conversational Thesaurus (134) and automatically converting the questions into nodes in the conversation data structure. Nodes added by way of the dictionary are automatically linked with the dictionary allowing synchronisation of nodes with the dictionary which enables sharing of input variations across chatbots;
- Templates of industry or special-interest specific questions and answers can be imported using the copy function which allows copying of entire conversation data structures from one chatbot to another. Imported nodes can be edited, copied. moved and deleted using the "drag and drop" and "cut and paste" features.
- Templates of questions and answers based on a particular personality type can be imported using the copy function. Imported nodes can be edited, copied. moved and deleted using the "drag and drop" and "cut and paste" features.

The templates are training material which are used by the application to automatically build a conversation data structure of a chatbot. Based on the training material, nodes are created and coded with instructions and linked to other nodes to form conversation paths. During a conversation with a correspondent, the nodes will be processed according to these instructions and/or relationship.

The interface further provides a menu bar with several drop-down menus which allow the chatbot designer to find, add, delete and update profile variables, and view profile reports; add, delete and update translations and stop words specific to the chatbot; select and update the default action and display messages; add, delete and update display messages associated with the fuzzy matching search mechanism; add, delete and update elements of the chat window interface; view, export and delete conversations; process and view statistical reports; clear conversation-related data; refresh the graphical user interface; perform a dictionary sync to exchange information with a centralised dictionary of questions (Conversational Thesaurus) which allows for sharing of input message variations across chatbots; inspect nodes in the conversation data structure to identify and fix duplications, broken conversation path links and broken related node links; schedule various tasks to be automatically performed in relation to such as the chatbot, including backups of content, setting of nodes in the conversation data structure to offline (unable to be searched) or online (able to be searched), etc; replace tags used within the conversation data structure; add, delete and update settings relating to the performance of the chatbot; view, add, delete and update settings relating to the identification of the chatbot; view, add, delete and update details about the chatbot owner; provide assistance and training for the chatbot designer or user; provide version information about the software.

The conversation data structure provides a visual representation of possible conversations between the chatbot and a correspondent. The interface also allows for tracking of changes to content in the conversation data structure and the alerting of identified parties when content in the conversation data structure has changed.

Node Types

Nodes can be selected from the following node types listed on the toolbar (202) to control the conversation flow of a chatbot. Each node type is coded with instructions which are processed by the interpretation engine (112) during a conversation.

- Output Node (O) instructs the interpretation engine (112) to display its output message to a correspondent (170) during a conversation. The output message is typically text-based, but can also comprise HTML, image, video and audio, and avatar animation such as smiling. The output message may also be an activity, such as loading a document. Any number of variations of an Output node can be added, and the different variations can be set to be displayed in a sequential or random order. The view also provides clickable tabs for adding code to format the message, add HTML and adding images, video and audio, and animation.
- Input Node (I) represents something that a correspondent could input to the chatbot during a conversation. If the last input message from a correspondent matches an acceptable input message or variation in the Input Node, then a match to the Input Node (I) is made. The Input Node includes a first or top-level Input plus any number of acceptable variations of this top-level Input. These variations are hidden from the correspondent and are used to appropriately match many different forms of correspondents' input messages the top-level Input.

A special instance of the Input node allows the chatbot user to match, to the input node when a correspondent's input message is equal to or greater in length to a number set for the special input node. For example, if the input node is set to @200 then each input message from any correspondent of 200 characters or more will match to this input node. This can be used to present a specific response to a correspondent, or to update a variable in the correspondent's profile.

For example, it is used to identify long input messages which may indicate that the correspondent thinks they are talking to a human instead of a robot. The chatbot can then update the correspondents profile, and choose a conversation path, for example a commercial chatbot can indicate to the correspondent that it is a robot, or a companion chatbot can assume the correspondent wants to believe it is human and follow more human-like conversation paths.

Get User Input Node (G) instructs the interpretation engine (112) to stop and Wait for the correspondent chatting to enter an input message.

Base Personality Response Node (B) instructs the interpretation engine (112) to respond with content from its base personality, rather than any content stored within the conversation data structure.

Profile Check Node (P) instructs the interpretation engine (112) to perform a conditional check on value of a profile variable for a particular correspondent. If all the conditions of the Profile Check are satisfied, then the chatbot considers the customer's profile to be a match to the node.

GoTo Node (G') instructs the interpretation engine (112) to go to another node in the conversation data structure and resume interpretation from that node.

Check Node (C) instructs the interpretation engine (112) to perform a search using the latest input message from a correspondent against Input Nodes within a folder. The best ranked Input Node is taken as a match and the interpretation engine (112) continues interpretation from that node, Random Node (R) instructs the interpretation engine (112) to select a child node of that node randomly and continue interpretation from that selected node.

Default Node (D) is a special type of Input Node (I) that is used to match to any input message during a conversation when a matching Input Node (I) cannot be found. For example, an Output Node (O) and a Get User Input Node (G) can be added to extend from the Default Node (D) to obtain and receive more information from the correspondent. Profile Check Nodes can also be added to extend from the Default node, to check the correspondent's profile for certain features, such as the topics they have previously asked about during the conversation, whether they have entered an input message of a specific length, etc. This profile information can then be used to tailor and personalise the response to the correspondent.

Folder Node (F) is a symbolic node that is used to organise nodes into sections or categories. Profile update rules can be associated with folders. Auto-learn statements, used in the fuzzy matching procedure, can be associated with folders.

Figure 2:
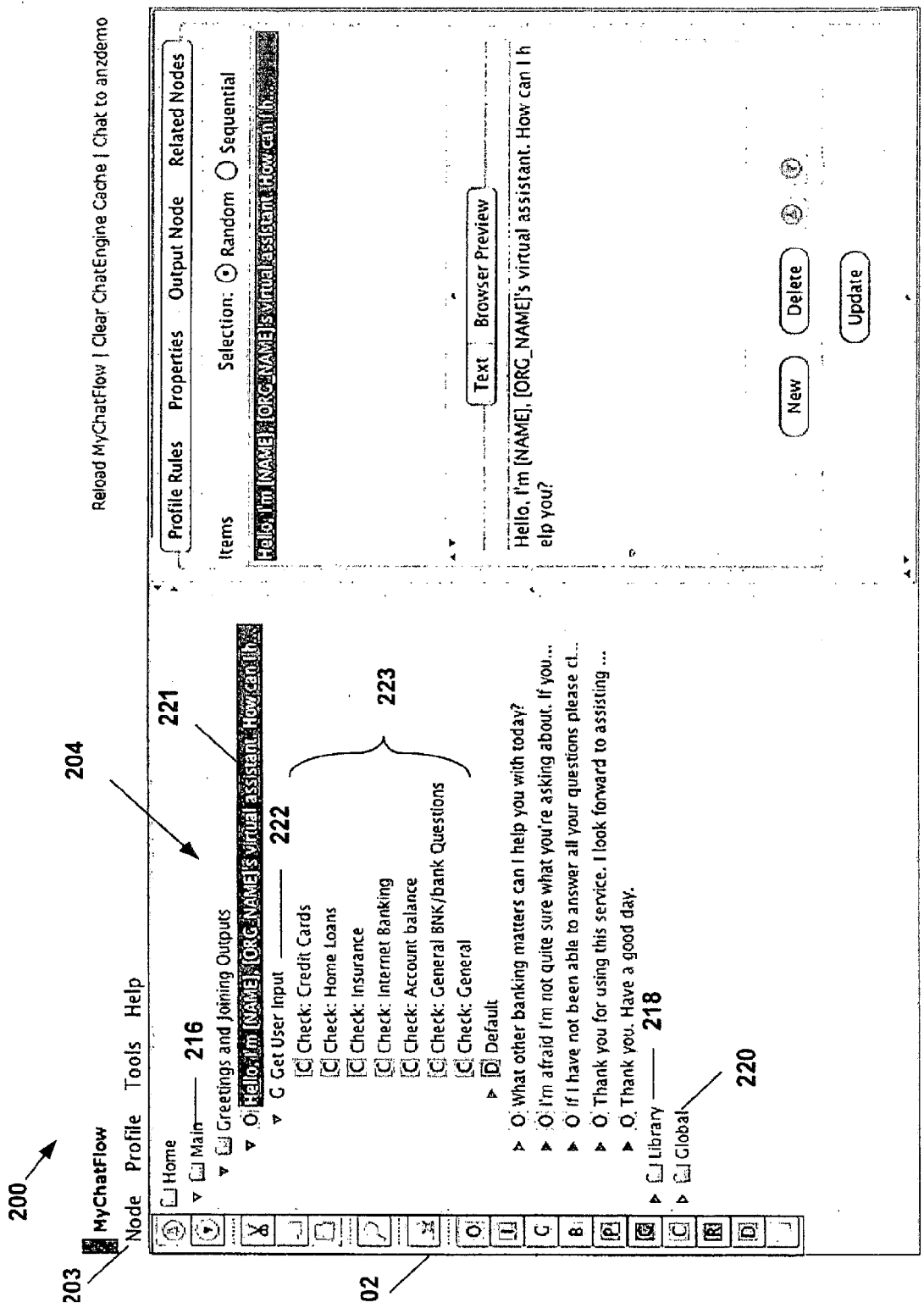
FIG. 2 is a screenshot of a main node view of a Main folder node.

In the chatbot shown in FIG. 2, the nodes of the conversation data structure (204) are organised under three main folder nodes: Main (216), Library (218) and Global (220).

Main folder node (216) holds nodes that the chatbot uses as a starting point to a conversation. In conversation data structure in FIG. 2, a correspondent (170) is greeted with a welcome message which is stored in an Output Node (221): "Hello. I'm [NAME], [ORG_NAME]'s virtual assistant. How can I help you?". In this example, a Get Input Node (222) and plural Check Nodes (223) extend from the Output Node (O) to receive the correspondent's input message and to match the message with any of the Input Nodes (I) In the folder associated with each of the Check Nodes (223). Tags [NAME] and [ORG_NAME] are global variables that can be defined by a user to represent the chatbot's name and user's organisation name. Other tags can be used to define other information that is included in the conversation data structure (e.g. product names, prices, telephone numbers, and URLs).

Figure 4:
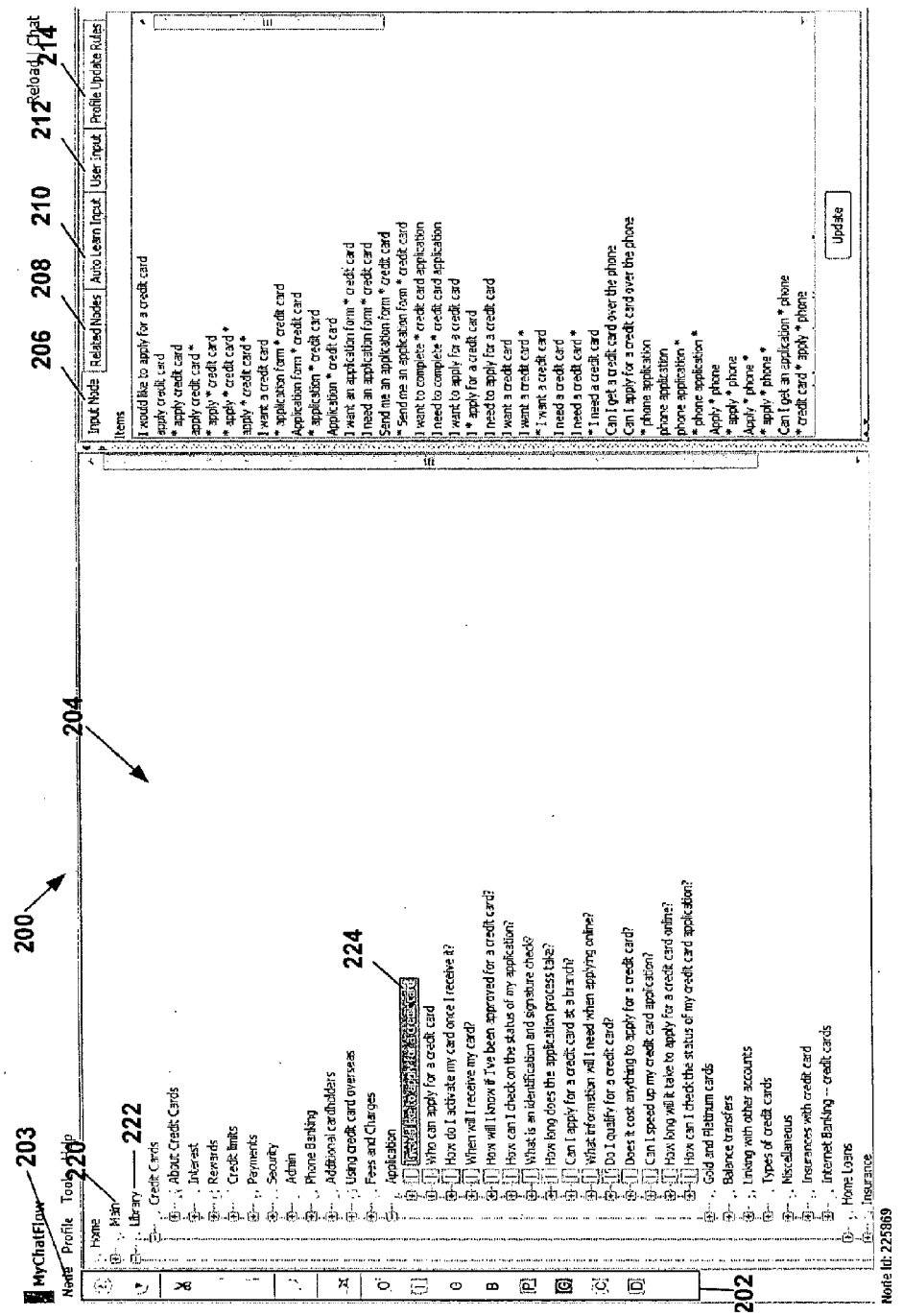
FIG. 4 is a screenshot of an Input Node View.

Library folder node (218) holds the bulk of the nodes used for conversation. Referring also to FIG. 4, the nodes are further organised under sub-folder nodes such as "About Credit Cards", "interest", "Rewards" and "Application" under "Credit Cards". Other folders can be added, such as a storage folder where content that is not currently being used is held.

Global folder node (220) holds links to all Input Nodes (I) in other folders that are considered for matching every single time an input message from a correspondent is presented to the interpretation engine (112).

A user can create any conversation data structure via any desired combination of nodes. The nodes selected, and the relationships between them, depend on what the application the chatbot is designed for. This gives the user complete design control over the chatbot. Conversation paths can also be updated easily without long periods of re-writing code.

The chatflow application (114) also allows a user to clone the chatbot, or export some components of the chatbot's knowledge to another chatbot. An import and export feature is also provided to allow a user to share or move an entire conversation data structure from one source to another. A user can export to a text file, or another account, and import from a text file or another account.

Base Personalities

A base personality can be viewed as a pre-trained chatbot which can act as the foundation intelligence for any chatbot. In the event that the interpretation engine (112) is unable to match a correspondent's input to an Input Node and not sure on how to reply, it can rely on a Base Personality Response Node (B) to come up with a reply. All base personalities (138) are stored in the chatbot database (130); see FIG. 1.

The chatflow application (114) provides a straight forward base personality selection interface for a user to select a base personality type; see FIG. 3. A user can select from one of the six personality types shown, each characterised by a range of personality updatable profile attributes. Therefore, when a user creates a new chatbot, it may be the result of combining the base personality with the content and knowledge they explicitly created themselves. Any number of base personalities can be created and chosen from. This allows the chatbot to be customised according to the branding and image a user wishes to project. Alternatively, the user can elect not to use a base personality.

Classrooms and Lessons

Figure 13B:
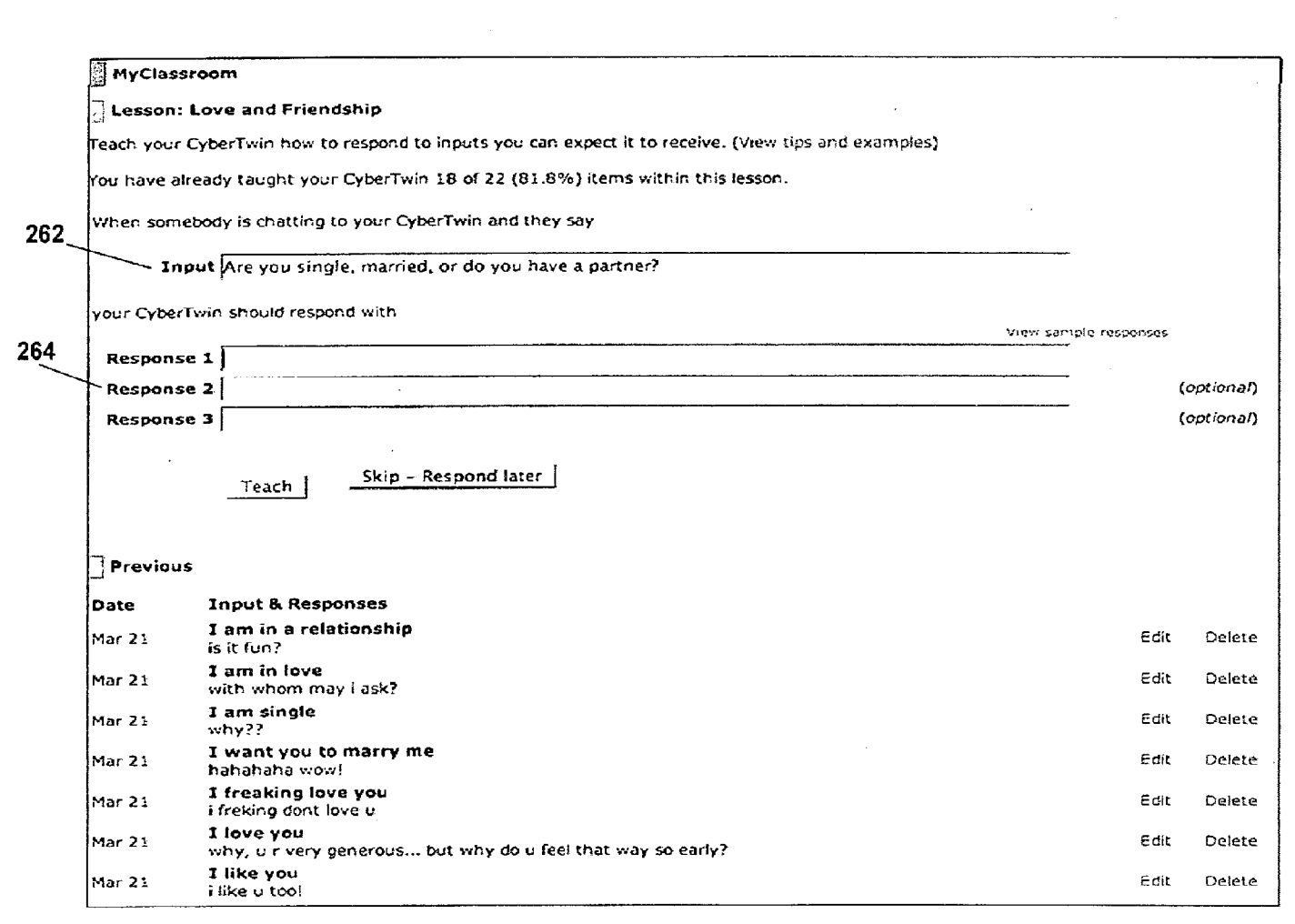

Referring to FIG. 13(a) and FIG. 13(b), the chatflow application (114) further has a classroom interface where by a user (160) is prompted to submit responses to expected input messages from correspondents. The classroom is organized into standard and special lessons (260), each representing a different topic area. A user can spend time in lessons, and provide sample input messages (262) and responses (264) so as to train their chatbot.

Dynamic Intelligence

The chatflow application (114) also supports automatic and dynamic creation of chatbots, using large bodies of new question and answer data to automatically train a chatbot in a new topic area. This provides the ability to automatically give a conversation interface to a body of textual content. All a user (160) has to do is submit a set of documents such as web pages, emails, web feeds such as Real Simple Syndication (RSS), chat transcripts, books, etc to a chatbot and it will analyse them to improve its knowledge.

Specifically, a chatbot can be automatically and dynamically created or trained following these steps:
1. Submit FAQ having a series of questions and answers.
2. Run dynamic knowledge learning over the FAQ to create a knowledge association dictionary. This task will automatically learn the key relationships and associations of terms and concepts in the FAQ content.
3. Submit unstructured text such as web pages, RSS, emails, chat transcripts, and documents to the chatbot. These are indexed and available to be searched in real time during a conversation.
4. Ask a question to the chatbot during chat and it will use the Knowledge Association dictionary to determine what the answer "looks like" and perform a search on the unstructured text accordingly to retrieve a best match.
5. Automatically generate additional variations for existing input nodes. This can be based on using the Knowledge Association dictionary.
6. Intelligently constructing sentences, remarks and responses from relevant text to suit the context of the conversation.

Dynamic Node Resolution

The chatbot can also be operated to direct a conversation by determining whether a matched node that has been selected for processing and/or a received input message satisfies a predetermined criteria if the determination is not in the affirmative, selecting a previously processed node for processing.

For example, the predetermined criteria may be whether an expected input node has been matched to by a correspondent's input message and, if not, returning to a previous node in order to redirect the correspondent to the unanswered question. This step involves dynamically resolving which node to process next based on the correspondent's input and the position of the last-processed node in a conversation path.

In another example, the predetermined criteria is whether the selected node processing is a node in the conversation data structure with no further instructions. Dynamic node resolution enables a chatbot to dynamically resolve which part of a conversation data structure to switch/go. This is because conversation data structure can be designed in such a way that does not require the creator to explicitly connect all the various conversational paths at design time. This makes the conversation data structure able to be rendered flexibly at conversation time via Dynamic Node Resolution. In essence, this gives the chatbot the ability to dynamically switch between nodes in the conversation data structure, depending on user input and the context of the conversation.

Dynamic Node Resolution keeps a tracking trail of all nodes in the conversation data structure it has visited throughout a conversation. When the chatbot hits a point in the conversation data structure where it encounters no further instruction, it looks back over the node trail to identify the most relevant point to return to and continue processing. It is important for Dynamic Node Resolution to go make to a relevant node so that when processing continues, a Get User Input node is again encountered, giving the user the ability to continue to chat and re enter input. In full action, Dynamic Node Resolution significantly contributes to the perception of an intelligent chatbot, one that can remember the past of a conversation and make smart decision on where to direct the conversation.

For example, a conversation could be heading down the path A but the user then says something that results in the chatbot switching to Path B. Half way down path B, the user could say something and the chatbot switches to Path C. Assuming Path C is completed and there are no explicit nodes instructions felling the chatbot where to go next, Dynamic Node Resolution may make a decision to switch back to Path B and continue the chat. Later down the track of Path B, the user may say something and that chatbot switches to Path D. In the same way, Dynamic Node Resolution would be aware of this and when the end of Path D is encountered a switch back to Path B is made and then back up to Path A and so on.

Views

Referring now to FIG. 4, chatflow application (114) provides interfaces to assist users in designing a chatbot. The interface provides a number of "views" associated with each node to assist users (160) in designing a chatbot.

Input Node View (206) shows variations or patterns of terms that can be matched to a highlighted Input Node (224). Variations can be automatically generated by the chatflow application (114), manually added by the user, or learned during real conversations with correspondents (170). In the example in FIG. 4, the following variations can be matched to the text of "I would like to apply for a credit card" of input node (224):

"* apply credit card" (* represents that other words may appear before "apply");
"apply credit card"; and
"Application form * credit card".

A user can add a an Input node and update the content of an Input node via a source file such as a spreadsheet or word processed document, and import the changes to the chatbot using the Import function in the "Node" menu, instead of or in addition to using this view.

Related Nodes View (208) allows a user (160) to explicitly select which nodes are to be displayed in a "further information" area of the chat window interface each time a selected node is processed. For example, the Output Node "I want to apply for a credit card" may have the nodes "Which credit card best suits my needs?", "Do I qualify for an [ORG_NAME] credit card?", and "Can I apply for a credit card online?" set as Related Nodes. Each time the Node "I want to apply for a credit card" is matched to, the nodes set as Related Nodes will appear in a "further information" area of the chat window interface.

Figure 5:
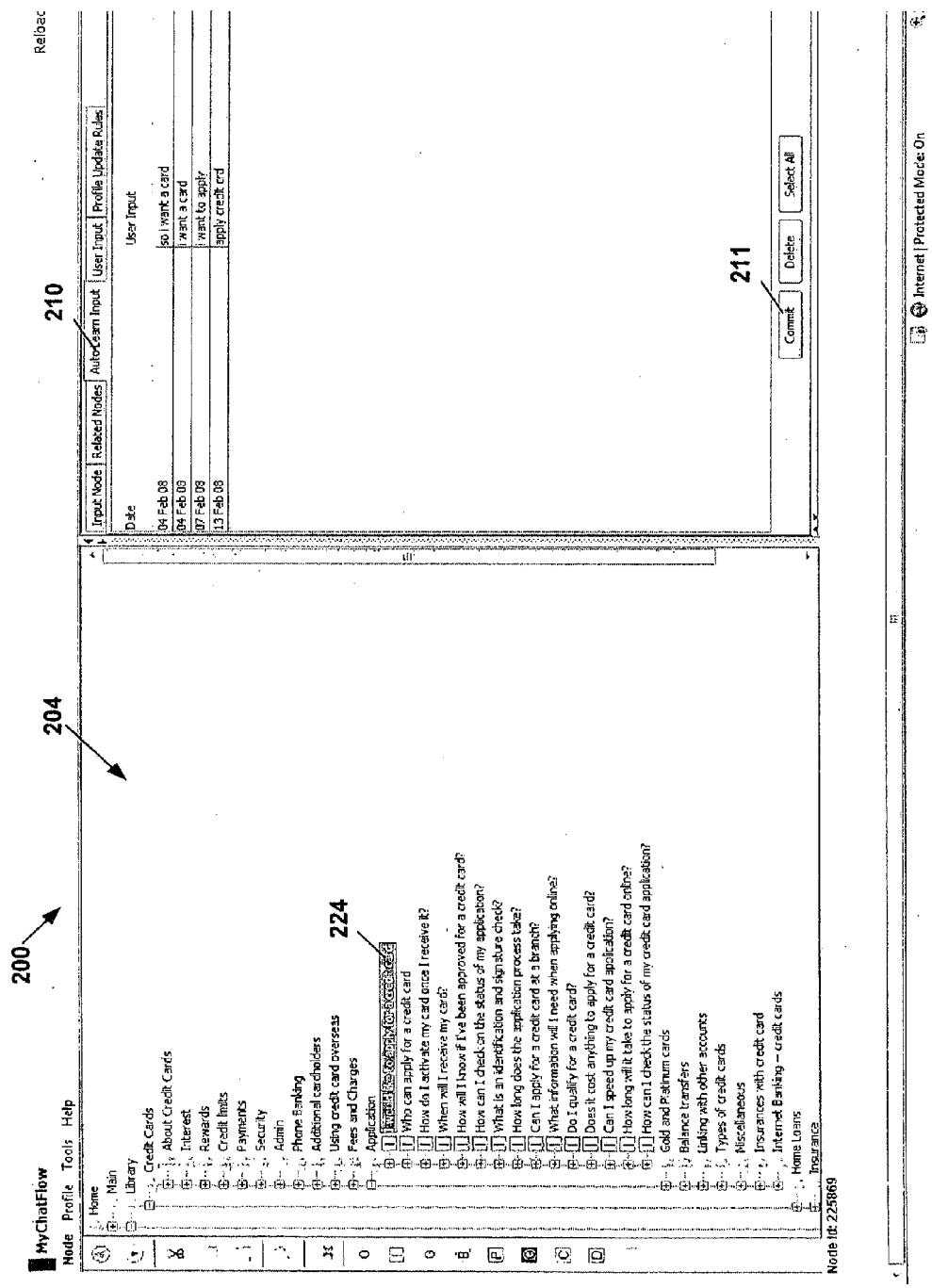
FIG. 5 is a screenshot of an Auto Learned Input Node View.

Auto Learned Input View (210) shows variations which have been associated with a given Input Node (I) based on actual conversations with correspondents (170); see FIG. 5. This allows the chatbot to learn new expressions that can be matched to an input node automatically. In FIG. 5, an association has been formed between "so i want a card", "i want a card", "i want to apply" to the highlighted input node (224). This association (auto learning) occurs as a result of the fuzzy search procedure which presents a number of possible matches to the correspondent. If the correspondent selects one of the fuzzy matched nodes, then an association (auto learning) is formed between the correspondent's input message and the selected node. The input message is quarantined until the user commits (211) the input message to the conversation data structure. A user can utilise this view to manually commit auto learned inputs to the conversation data structure. The user can commit the input message to the node with which it is associated, can commit the input message to another node, can create a new node with the input message, or delete the input message.

Figure 6:
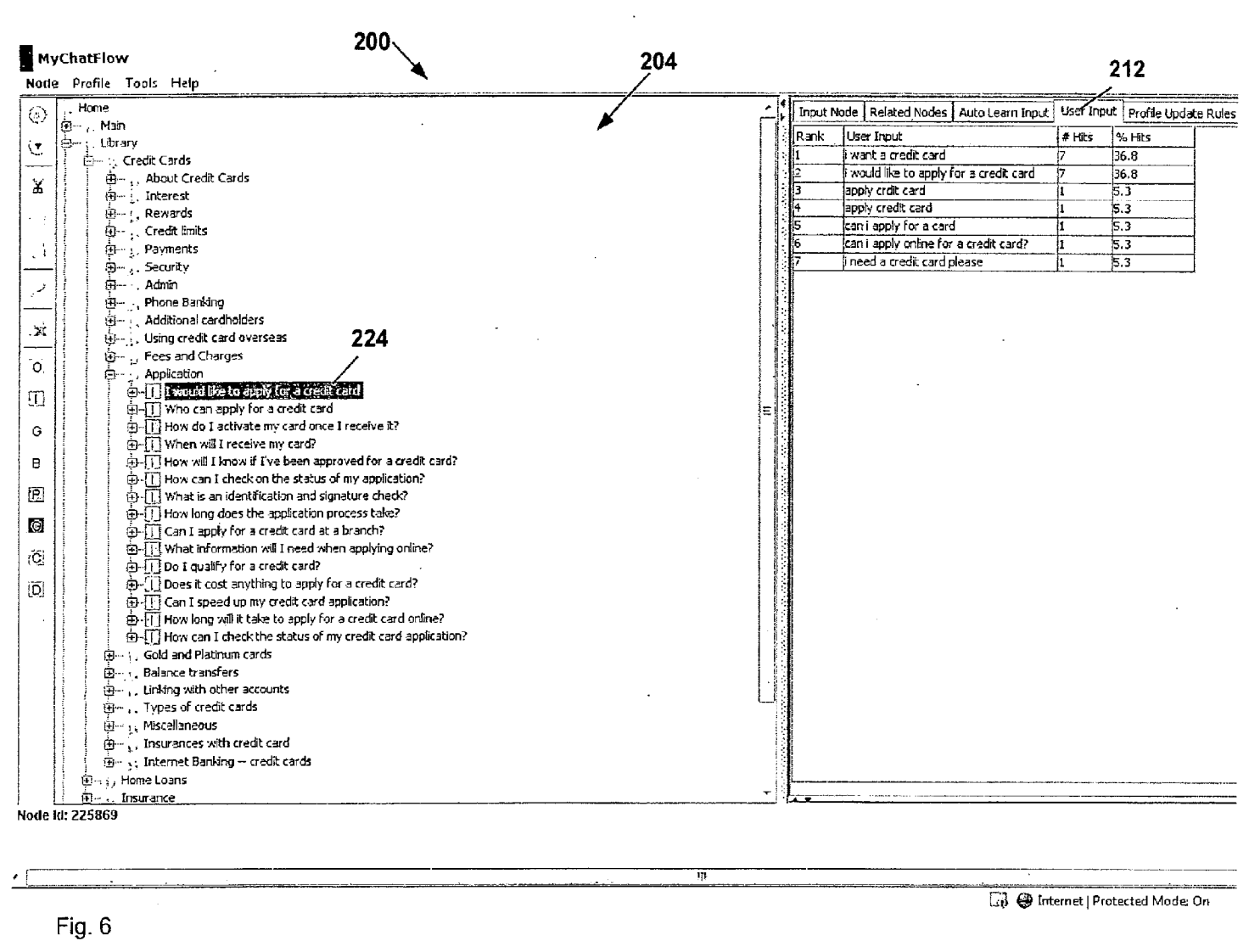

User Input View (212) shows actual inputs which have been matched to a given input node (224); see FIG. 6. The inputs are ranked according to the number of entries and percentage of the total hits on the node. In FIG. 6, the view shows that almost 74% of the correspondents (170) have entered "i want a credit card" or "i would like to apply for a credit card" when asking for credit card application information. User Input View also provides a facility for the user to see which input messages would currently match to which Input nodes in the conversation data structure, and which input messages would not match to, any Input nodes in the conversation data structure.

Figure 7:
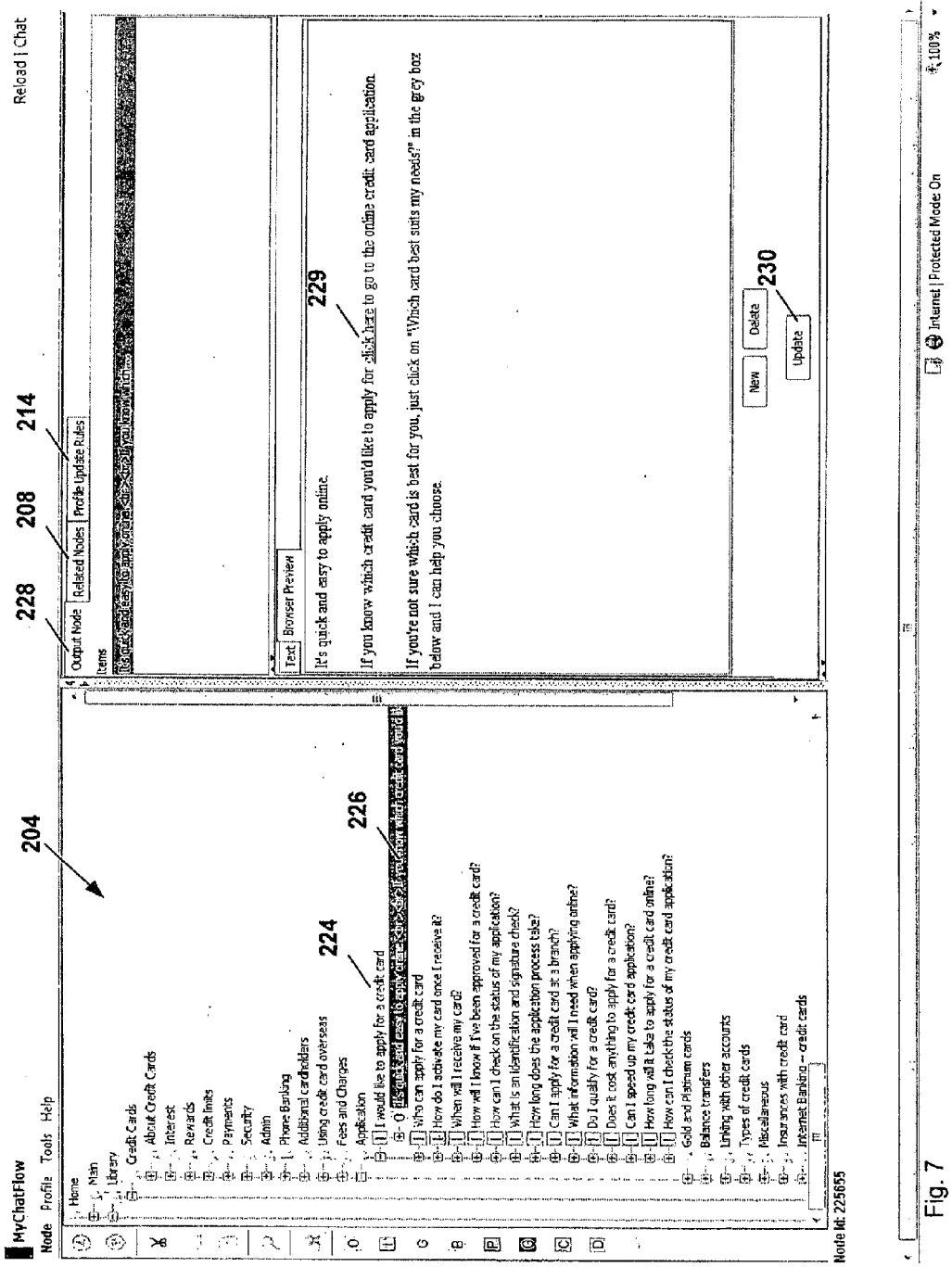
FIG. 7 is a screenshot of an Output Node View.

Output Node View (228) allows a user (160) to add, edit and update (labelled as 230) content associated with a highlighted Output Node (226); see FIG. 7. Two different views of the Output node are available, including a Text view which is editable and displays the coding used for formatting the message, and a Browser view which is not editable and displays the message as it will appear in a browser window. In the event that a correspondent's input message is matched to its parent Input Node (224), the content of the Output Node (226) will be displayed to the correspondent. While only textual and HTML (229) content is shown in FIG. 7, it will be appreciated that image, audio, video files or commands to automatically redirect a correspondent's internet browser to a specific page, commands to read an audio file or animate an avatar and other instructions may be added. The HTML link (229) directs the correspondent to a separate web page to obtain more information. A user can also add a an Output node and update the content of an Output node via a source file such as a spreadsheet or word processed document, and import the changes to the chatbot using the Import function in the "Node" menu, instead of or in addition to using this view.

Figure 8:
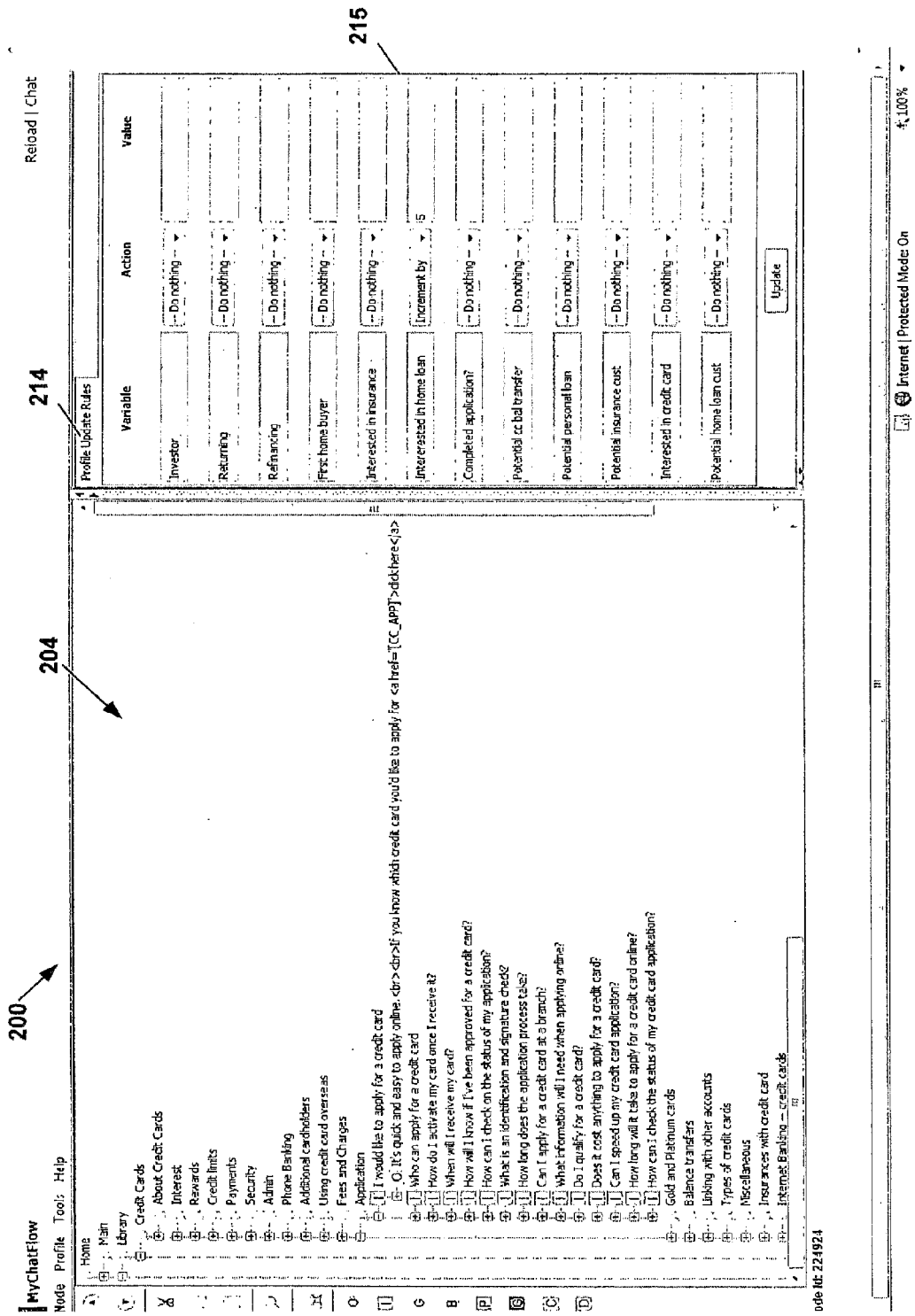
FIG. 8 is a screenshot of a Profile Update Rules View.

Profile Update Rules View (214) allows the user to set profile rules to instruct the interpretation engine (112) to automatically update the value of a profile variable of a correspondent; see FIG. 8. Profile variables are created to record attributes of a correspondent so as to better personalise a conversation and to gather information about the behaviour, interests and intentions of correspondents. In FIG. 8, the value of profile variable "Interested in home loan" (215) will be incremented by 5 in the event that the interpretation engine matches a correspondent's input Message to a node which has been associated with this variable (215).

Figure 9:
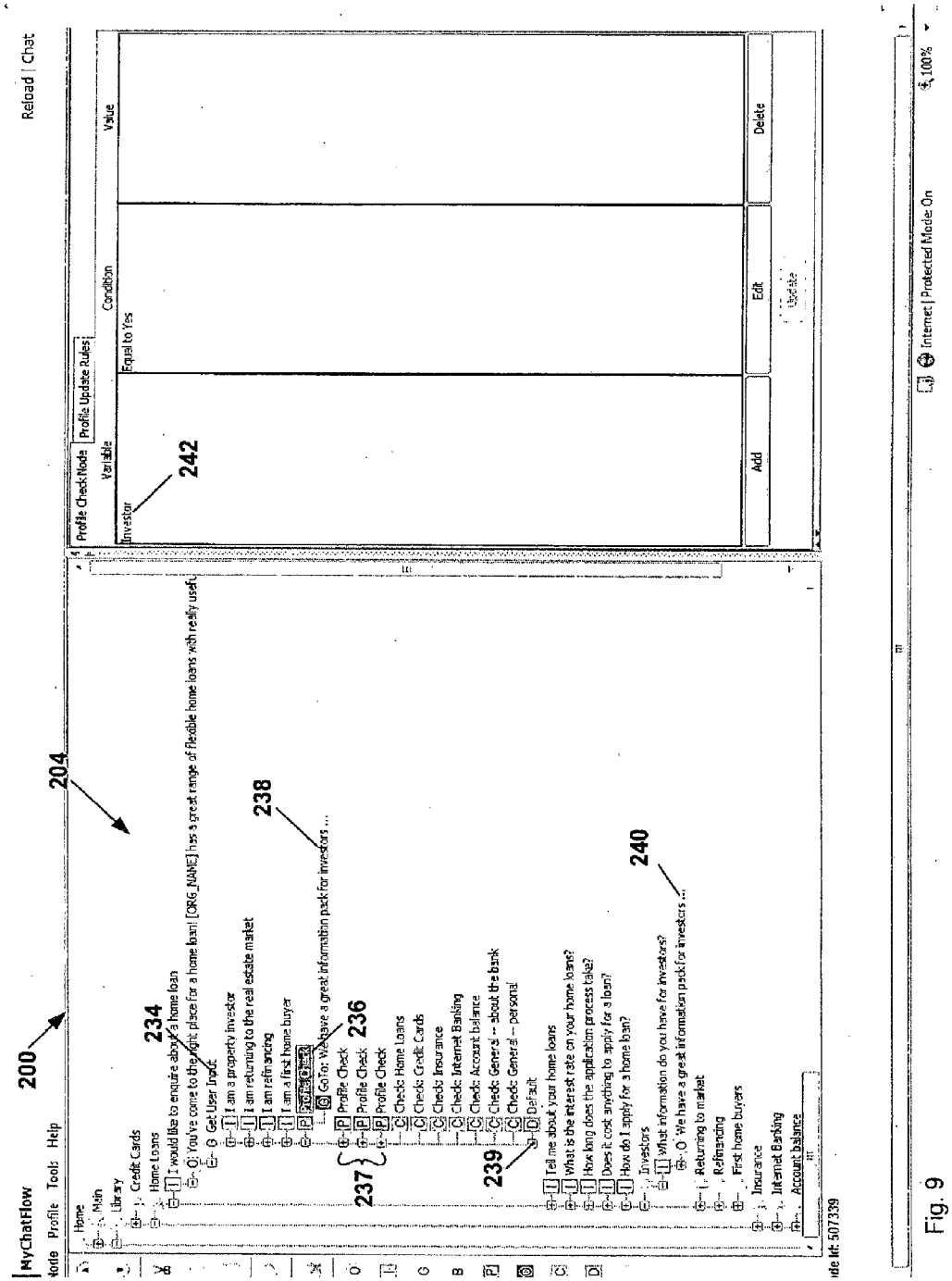
FIG. 9 is a screenshot of a Profile Check Node View.

Profile Check Node View (232) allows a user to add, delete and update profile variables on which conditional check should be performed. In FIG. 9, the highlighted Profile Check Node (236) is a child node of a Get User Input Node (234) which instructs the interpretation engine (112) to obtain an input message from a correspondent. Once an input message is received, the highlighted Profile Check Node (236) instructs the interpretation engine (112) to check whether the "Investor" profile variable (242) of the correspondent is positive, if yes, the interpretation engine (112) will navigate to GoTo Node (238), a child node of the Profile Check Node (236). If no, the check will also be performed by the remaining Profile Check nodes (237) for the same process. If they are all unsuccessful the interpretation engine (112) will navigate to the Check: Home Loans node.

Check Node View allows a user to explicitly select a folder a check should be performed on. This view is only available for check nodes.

GoTo Node View allows the user to explicitly select which node a GoTo links to. In FIG. 9, the GoTo Node (238) is set up to redirect the conversation to an Output Node (240) in folder node "Investor" which provides information that is relevant to real estate investors.

Properties View (240) displays the various properties associated with each node; see FIG. 10. Properties recorded are date created, date modified, number of hits (i.e. number of times the engine (112) has navigated to this node), number of last hits (i.e. number of times this node has been the last node before the end of a conversation), number of links (i.e. number of nodes that are linked via GoTos or other link), whether the node is linked to a centralised dictionary of questions ("Conversational Thesaurus" 134) to allow for sharing of variations across chatbots, details of any such link and the ability to edit the link to the dictionary, a flag to indicate that the node is an auto learn (fuzzy search) candidate, a flag to indicate whether a joining statement should be inserted when dynamic node resolution is performed (241), a flag to indicate whether the node is Offline (and unavailable for matching), a flag to indicate whether the node should be hidden in a "Standard View" (standard interface).

Auto Learn Output View allows the user to add, edit and delete statements associated with the fuzzy matching search functionality ("auto learn statements") to particular folders and sub-folders in the conversation data structure, so that when there are fuzzy matches, the auto learn statements associated with the folder containing the best fuzzy matching node is presented to the correspondent.

The views provided depend on the node that is selected and highlighted in the conversation data structure (204).

Toolbar Menus

The chatflow application (114) provides a number of toolbar menus associated to assist users (160) in designing a chatbot.

Node Menu, for performing functions with nodes in the conversation data structure including: adding, deleting and updating nodes; expanding or collapsing the display of conversation paths in the conversation data structure; finding data within the conversation data structure; importing content to the conversation data structure from another chatbot or from a text file; exporting content from the conversation data structure to a text file;

Profile Menu for viewing and editing profiling information including: adding, deleting and updating profile variables and; generating profile reports;

Edit Menu for editing features of the chatbot including: adding, deleting and updating translations and stop words specific to the chatbot; adding, deleting and editing tags specific to the chatbot; selecting the default action of the dynamic node resolution mechanism and adding, deleting and updating statements ("joining statements") to be presented to correspondents as part of the dynamic node resolution procedure; and adding, deleting and updating statements ("auto learn statements") to be presented to correspondents as part of the fuzzy matching procedure;

Tools Menu for viewing settings relating to the chatbot including: adding, deleting, updating and previewing elements of the Chat Window interface; viewing, exporting and deleting conversations; processing and viewing statistical reports; clearing conversation-related data saved in the chatbot; refreshing the graphical user interface; performing a dictionary sync to exchange associated acceptable variations with a dictionary ("Conversational Thesaurus"); inspecting nodes in the conversation data structure to identify and fix duplications, broken conversation path links and broken related node links; setting schedules for various tasks including backing up the content of the chatbot, switching nodes to online (searchable) and offline (not searchable); replacing tags used in the chatbot's content; viewing, editing, deleting and updating settings relating to whether caching is used for processing efficiency; whether fuzzy matching is used where an input message has no matched node in the conversation data structure; the maximum number of fuzzy matched items displayed to the correspondent; the number of related nodes displayed to the correspondent; the chatbot identification number, username, password and display name; the base personality chosen (if any); the chatbot's response time, language, time and date settings; the first name, last name, date of birth and email address of the chatbot user;

The standard interface also provides a number of views, including:

MyFAQ View which allows for the adding, updating and formatting of input and output node pairs that form part of the conversation data structure, as well as the tracking of changes to the content and a system for alerting other users when content has been changed and/or requires attention;

MySettings View which displays settings applying to the functioning of the chatbot and allows for these to be updated;

MyReports View which allows the chatbot owner to create graphical reports of information about interactions with the chatbot;

MyDeployment View which allows the chatbot owner to determine the method of deploying their chatbot, including the places it is to be deployed such as on a webpage, in an instant message window, in a virtual world such as Second Life; the form the deployment is to take, such as a chat window that sits alongside their website with or without an avatar, an avatar embedded on a webpage, etc; and various design elements of the deployment, including the use of logos, avatars, icons and colours to customise the form of deployment.

Correspondent Profiling

A chatbot can be designed to collect and remember a vast amount of information about its correspondents without the involvement of technical staff. The profiling capabilities allow the chatbot the ability to "remember" things about a correspondent so as to better personalise the conversation and to gather information about correspondents' behaviour, interests and intentions which is useful to the chatbot owner.

Using the interface in FIG. 11(*a*), a user (160) can define a profile variable by specifying a name, a variable type and an initial value. Types include text, number and yes/no. Once a profile variable is defined, a profile update rule can be assigned to the node using the Profile Update Rules View (214) shown in FIG. 8.

During a conversation the interpretation engine (112) is operable to update the value of a profile variable according to its profile update rule. For example, if a correspondent's input message matches to a node (e.g. "What home loans do you have?") that has a profile rule associated with it (e.g. set to "yes" for variable "interested in home loan"), the correspondent's profile is updated to indicate that profile variable "interested in home loans" is set to "yes". During a conversation, the interpretation engine (112) is also operable to perform profile checks at a Profile Check Node (P). For example, a Profile Check is could be set to check whether a correspondent's profile has been set to "yes" for the variable "Interested in home loans". If the correspondent's profile is set to "yes" for that variable, then it is matched to the Profile Check and the profile check node is processed. If the correspondent's profile is set to "no" for that variable, the interpretation engine moves to the next point in the conversation data structure. Therefore, a chatbot is able to build a correspondent's profile containing any number of profile variables such as age, readiness to purchase, contact details, type of consumer, willingness to pay, products they are interested in, credit worthiness, psychological characteristics, preferred learning styles, and so on.

Figure 12:
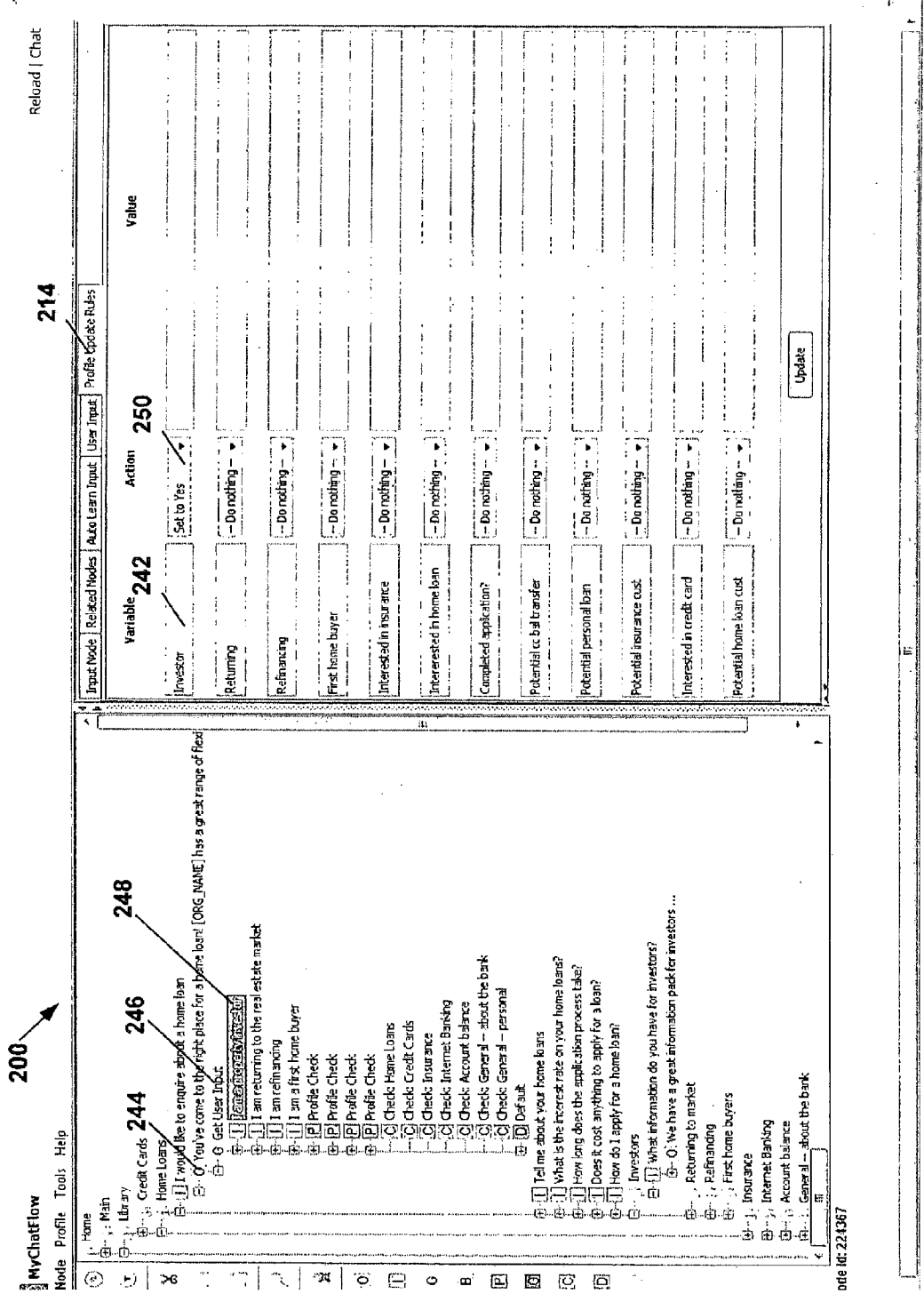
FIG. 12 is a screenshot of a Profile Update Rules View.

Referring now to FIG. 12, a chatbot could be designed to track whether a correspondent is an investor using a series of Output (244), Get User Input (246) and input (248) Nodes. The user would firstly have to define an "Investor" profile variable (242) of type "Yes/No". The second step is to get the interpretation engine (112) to determine whether the correspondent is an investor. This could be performed by, adding an Output Node (244) to display the question and a Get User Input Node (246) to receive the correspondent's input. Then finally, a profile update rule (250) is added to an Input Node (248) to instruct the interpretation engine (112) to update the "Investor" variable (242) of a correspondent's profile in a particular manner (i.e. increment or decrement by an amount, set to a number, set to a text input, set to "yes" or "no") if the node is matched to. In this case, if the correspondent's input message can be matched to "I am a property investor", or any of its variations, the "Investor" variable (242) for that correspondent's profile will be set to "Yes" according to the profile update rule (250).

The correspondent's profile can be used to ensure that the conversation is highly personalised, and is driven by the needs of an individual customer rather than a pre-defined menu system. For example, if the correspondent is identified as an investor, they may be offered information about investment opportunities, or if they are identified as a high value customer, the correspondent may be automatically passed on to a real human for one-to-one attention. Profile variables for a correspondent, include enquiries they have made, processes they have started, not completed or completed, etc can be stored and used for future conversations with that correspondent.

The collected profile variables can also be used to cross-sell other products that may be of interest to a correspondent. For example, a correspondent who is interested in residential home loans may also be interested in home insurance. The profile variables can be used to generate detailed reports on user behaviour, such as in FIG. 11(*b*), which can also be used to improve the design of the conversation data structure (204) over time, and to provide the chatbot owner with information about the behaviour, interests and intentions of correspondents.

The profile variables and profile information for a correspondent can also be linked into existing customer relationship software or data, so that the customer relationship software can be used to update the profile variables and correspondent profiles and vice versa.

The information collected about a correspondent using profiling can be interpreted using psychological and other took, and/or combined with other information about the correspondent to provide an assessment of the correspondent for a particular situation, such as in an employment recruitment setting or a credit risk assessment setting. Profile information for a correspondent can be stored for use in future conversations with the correspondent.

In another example, a chatbot providing sales support may have a numerical profile variable set up for each product included in its content. Profile update rules of "Increment by 1" may be applied to each node that reveal interest in a product, for example nodes such as "Tell me the features and benefits of Product X?", "Tell me the price of Product X?" or "How quickly can I get Product X?". When a correspondent enters an input message that matches to one of these nodes, the correspondent's profile is updated to show an interest in Product X of +1.

This information can be used in a number of ways. For example, it could be aggregated to show the level of interest in an individual product, or the relative levels of interest between different products. It could also be used to tailor the chatbot's responses to the correspondent.

In a further example, a chatbot providing customer service and sales support in a banking context may have profile variables set up for income level, asset level, value of mortgage, value of investments. The profile variables in this case might be set, for example, "high income yes/no", "assets over $1M yes/no", "mortgage over $500K yes/no", and "investments over $250K yes/no". If a correspondent gives information (for example when completing an application form) about these aspects of their financial situation, the profile for that customer will be updated with "yes" or "no" according to the information they have given. In this example, a profile check node might be set to check whether all of the variables "high income", "assets over $1M", "mortgage over $500K" and "investments over $250K" were set to yes. If all of the variables were set to yes for that correspondent, then a match would be created with the profile check node and the conversation would follow a particular set path (for example, the customer might be offered the opportunity to meet with a personal banker).

Another profile check node might be created to check whether only two of the variables were set to "yes" and if that was the case for a correspondent, then there would be a match to that profile check node and the conversation would follow a different set path (for example, it might be suggested to the customer that a particular deposit account might increase their return on investment).

Profile-Based Delivery of Information

Depending on a correspondent's preferences, psychological profile and learning style, the interface representing the chatbot can also be automatically customised. This includes the content to be delivered; the layout and presentation of the information to be delivered; the format of the information, such as using images, webpages, and multimedia files, a response to the correspondent in the form of a robot action, and the source of information. For example, the chatbot can customise the language style of the information presented, the level of detail given, automatically loading webpages or providing a link for the correspondent to click, including multimedia information, presenting the information in 2D or 3D form, etc.

The chatbot can also access existing customer management systems to draw information about a correspondent, such as their name, their history with an organisation (such as applying for a home loan or booking a airplane flight), etc., and use this information within the conversation to establish rapport with the correspondent and to provide detailed information about the correspondent's personal situation (such as account balance, frequent flyer point balance, loan approval status, etc).

The chatbot can tailor the layout and presentation of the content to be delivered to the correspondent in a number of different ways. The chatbot can draw on an existing database of information about the correspondent, including their expressed wishes regarding content delivery and information about their preferences inferred from their behaviour during conversations. For example, some correspondents may prefer information delivered graphically rather than verbally; some correspondents may prefer verbal information to be presented in point form rather than complete sentences; some correspondents may be prefer a lot of detail rather than less detail.

Similarly the chatbot can choose the most appropriate external sources of information for the correspondent, and the most appropriate method of delivering them. For example, some correspondents may prefer the chatbot to automatically load a webpage rather than providing a link for the correspondent to click; some correspondents may prefer information to be delivered in a multimedia format; some correspondents may prefer information to be relayed using static images such as graphs, maps or photographs, etc.

Chatbot Database (130)

Referring to FIG. 1 again, the chatbot database (130) stores all chatbots (132) created using the chatflow application (114) by the users (160). Knowledge learned and developed within a particular chatbot can be stored globally in the chatbot database (130), and shared with other chatbots. The idea here is to link Input Nodes (I) within a conversation data structure with entries in the Conversational Thesaurus (138) (via a dictionary link) and Translation Dictionary (136) stored in the chatbot database (1.30) and automatically update these entries when an Input Node (I) learns a new variation; see FIG. 4. Advantageously, when new chatbots are created by other users, Input Nodes (I) can be linked to dictionary to automatically populate their knowledge with the latest. Performing a dictionary sync from within a chatbot exchanges variations between the chatbot and the Conversational Thesaurus.

The Conversational Thesaurus (134) is an extensive centralised dictionary with thousands of conversational synonymous variations grouped together to form concepts across a range of topic areas. This thesaurus is used by the interpretation engine (112) to match inputs during search in an effort to understand its meaning. For example, here is a sample of the concept "Hello" in the conversational thesaurus:

Hello
Hi there
Hi *
Hey
Hello *

In this particular example, five variations items are shown as part of the "Hello" concept. Wildcard symbol '*' means that one or more terms are expected to appear in its place. So, if a correspondent were to enter input message "Hi man", a match would be made with "Hi *" variation. A concept can be made up of one or more variations items. These variations items can be created automatically, learned from conversations (through the fuzzy search/auto learning procedure) and created by human knowledge engineers. They may be edited by human knowledge engineers for accuracy and suitable coverage. As explained with reference to the Input Node View (206) in rig, 4, variations for Input Nodes (I) in a conversational data structure are written in the same form as an entry in the Conversational Thesaurus (134).

Translation Dictionary (136) is a dictionary accessible by the interpretation engine, (112) during matching to convert a correspondent's unnormalised input message into a format that is compatible with the variations stored with an Input Node (I). Unnormalised inputs are those which contain misspellings, slangs, foreign language terms or other cultural language events. For example, a correspondent could enter an unnormalised input "cya 18r" which does not have a direct match in the Conversational Thesaurus (134). The interpretation engine (112) attempts to convert the unnormalised "cya 18r" into a normalised form "See you later". In other words, the Translations Dictionary (136) is essentially responsible to hold mappings between unnormalised items and normalised items, such as the following:

| Unnormalised Term | Normalised Term |
|---|---|
| Cya | see you |
| 18r | Later |
| Credit | Credit |
| Luuv | Love |
| Luv | Love |
| Luve | Love |
| Luvlee | Lovely |

In addition to the centralised Translation Dictionary (136), translations specific to a chatbot can be created and stored in the data for the chatbot. These translations are checked prior to the centralised Translation Dictionary (136) and take precedence over those in the centralised Translation Dictionary (136). Chatbot database (130) also stores base personalities (138), template chatbots (140) and knowledge association dictionaries which allow rapid creation of new chatbots.
Interpretation Engine (112)—Conversation with a Chatbot Referring to FIG. 14, the interpretation engine (112) follows a top-down, left-to-right approach to the interpretation of the conversation data structure. At the beginning of a conversation with a correspondent, the chatbot commonly introduces itself and explains its purpose to the correspondent. The interpretation engine (112) starts at the top node sitting in the Main folder (216) and processes that top node; steps 305 and 310. For example, in the conversation data structure (204) shown in FIG. 2, the interpretation engine (112) displays a greeting message coded with the top Output Node (221) in the Main folder (216) at the beginning of the conversation.

After processing the current node, the interpretation engine (112) determines whether that current node has any child nodes, in which case it obtains a list of the child nodes and takes the top child node as the current node; see steps 315 and 320. Otherwise, the interpretation engine (112) moves down the conversation structure to the sibling nodes which are on the same level as the current node and processes the top sibling node; see steps 325 and 330. Continuing from the example in FIG. 2, the top Output Node (221) has a Get User Input Node (222) related to it (i.e. extending from it). The interpretation engine (112) will process this Get User Input Node (222) before navigating to its child Check and Default Nodes.

Figure 14:
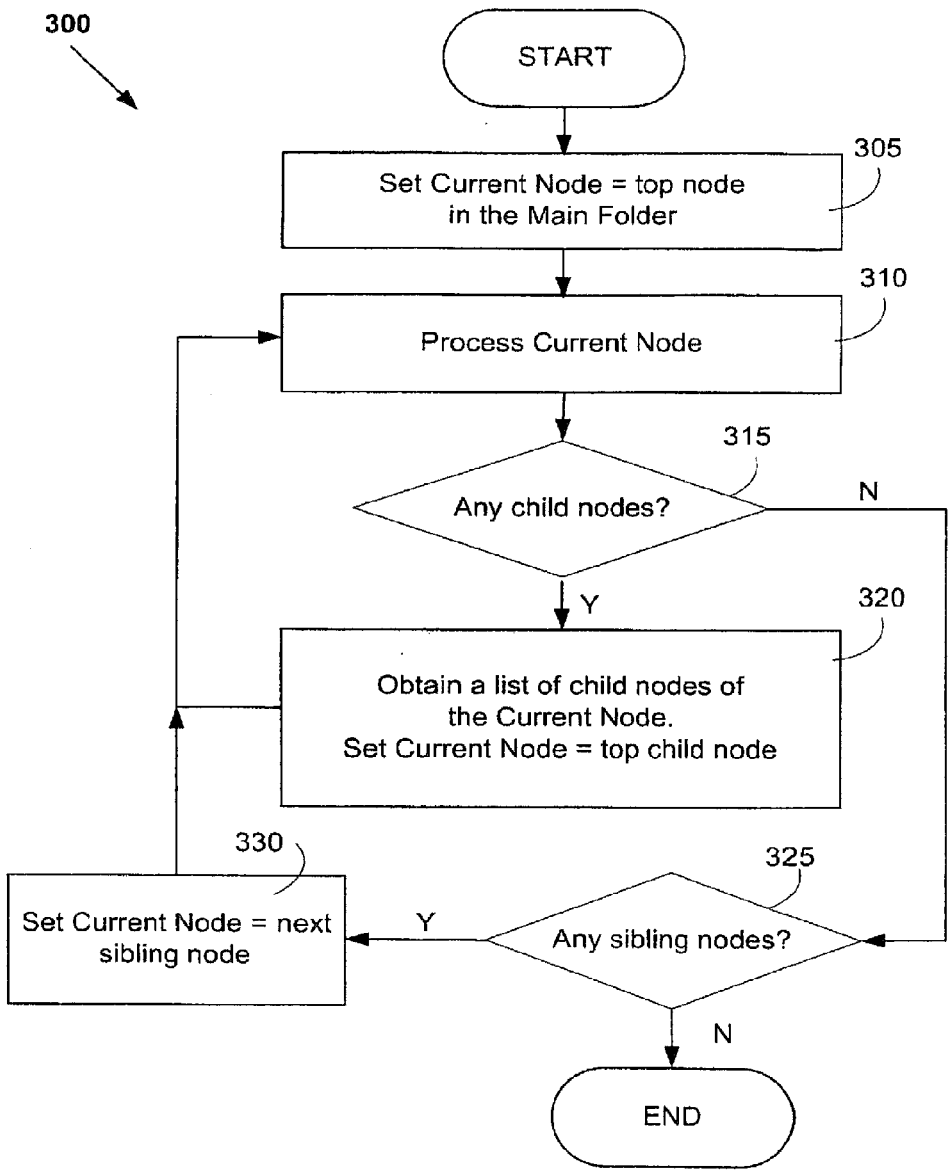
FIG. 14 is a flowchart of a method performed by the interpretation engine.
Figure 15:
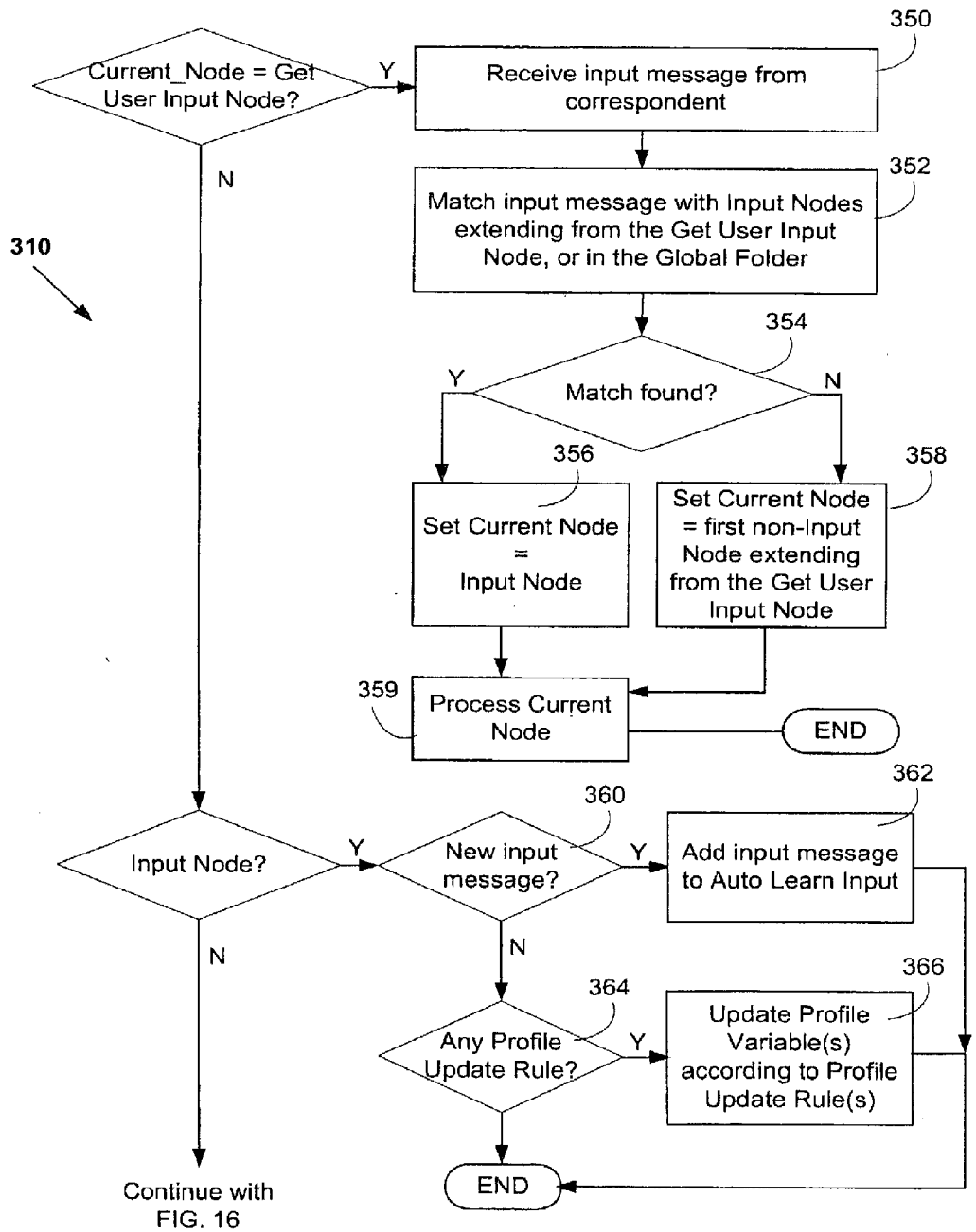
FIG. 15 is a flowchart of the processing step in FIG. 14.
Figure 16:
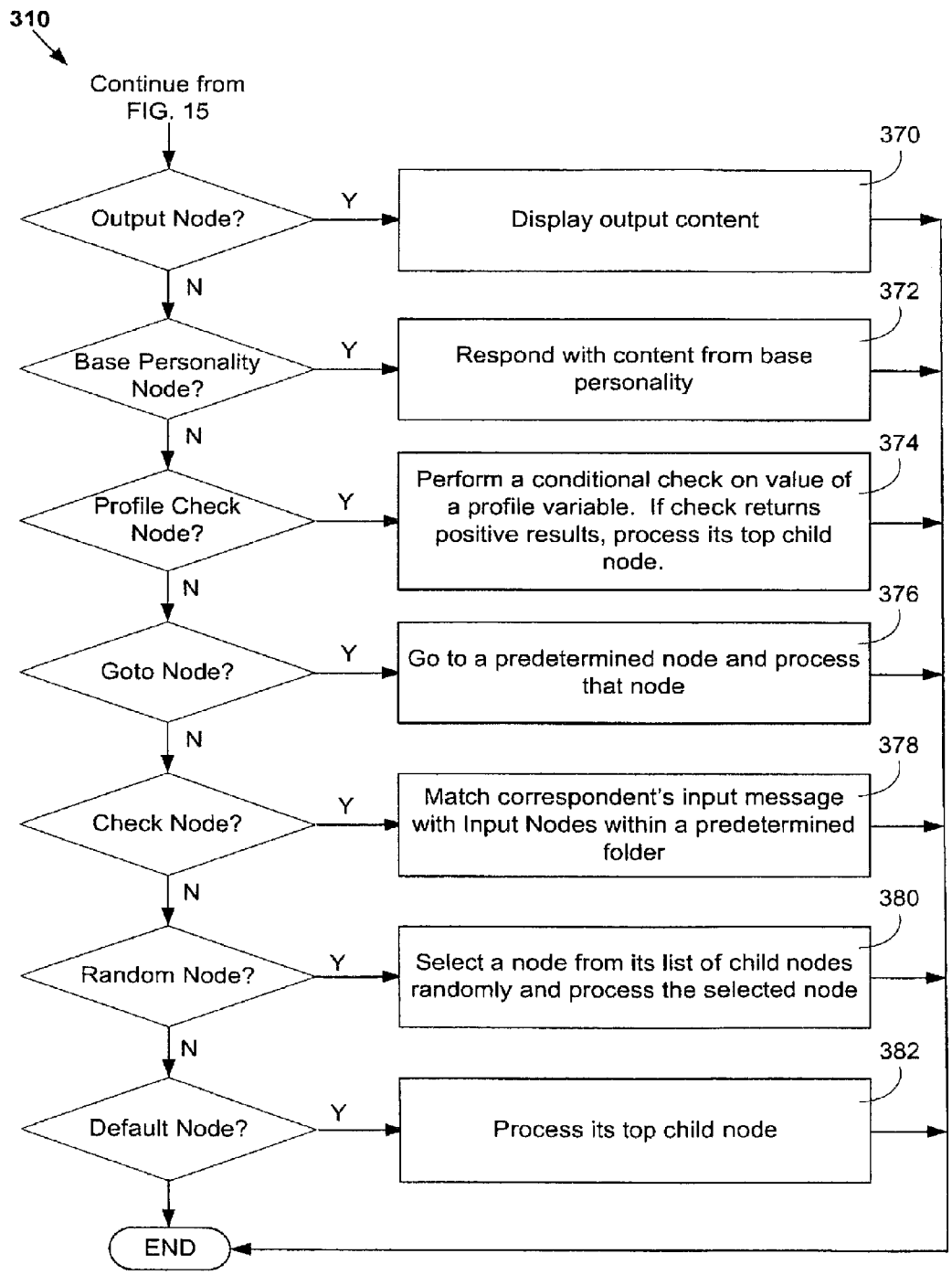
FIG. 16 is a flowchart of the processing step in FIG. 14.
Figure 17:
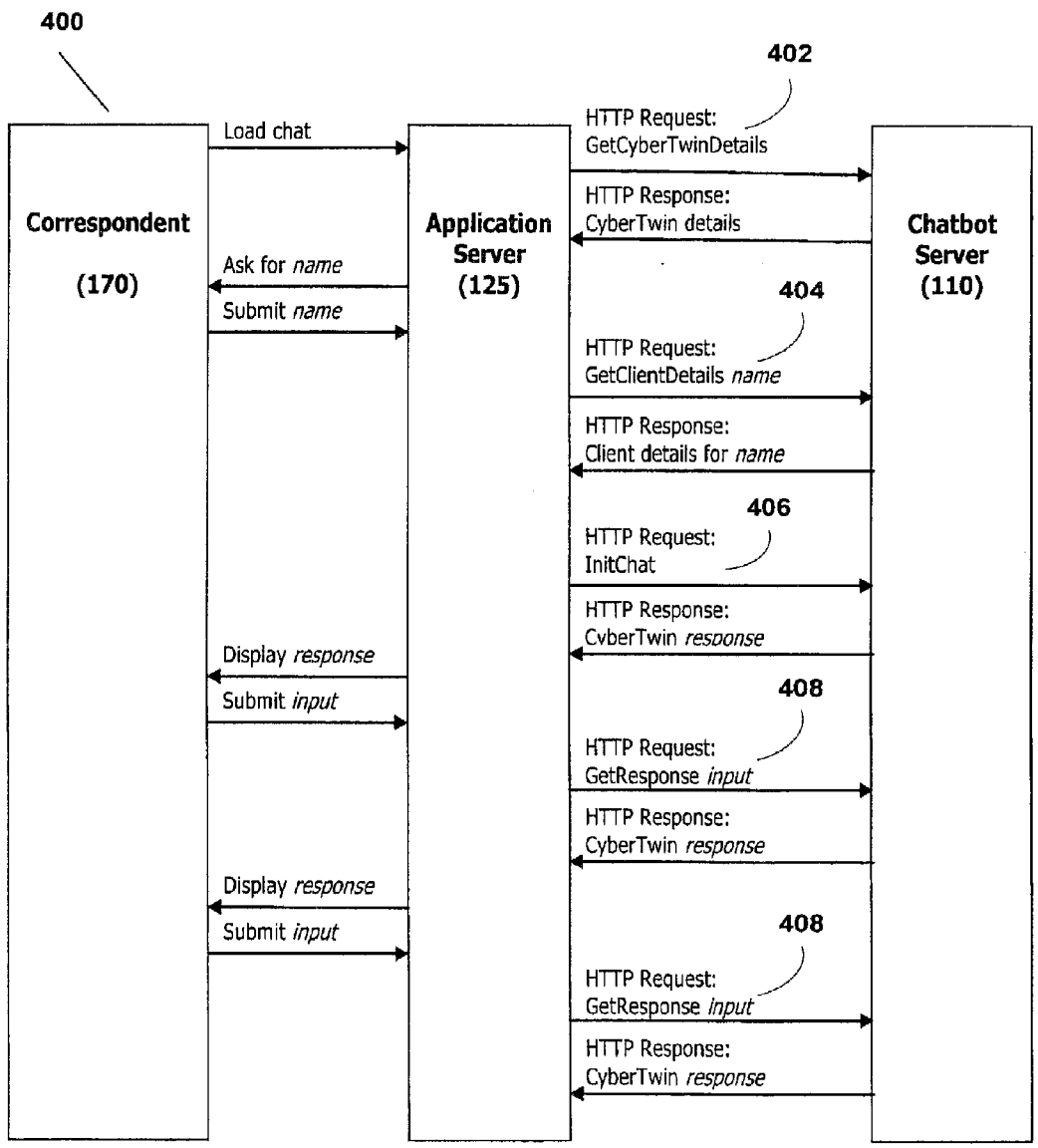
FIG. 17 is a message flow diagram between a correspondent and a chatbot server via an application server.

Referring now to FIG. 15 and FIG. 16, the processing step (310) in FIG. 14 depends on the type of node and the instructions coded with that node.

The Get User Input node is a place in the conversation data structure where the interpretation engine received input messages from a correspondent (170).

If the current node is a Get User Input Node (G), the interpretation engine (112) will wait for an input message from the correspondent (170); step 350. The engine (112) will then attempt to match the received input message with Input Nodes extending from the Get User Input Node (G), or other folders of Input Nodes that are set to be checked according to a Check Node or other Input Nodes stored within the Global Folder (220); step 352. If a match is found, the interpretation takes the selected Input Node as the current node; steps 354 and 356. If no match is found, a fuzzy matching searching is performed. If the correspondent selects 'none of the above' from the fuzzy matching search results, the top non-Input Node extending from the Get User Input Node will be selected for processing; steps 358 and 360.

The matching step generally involves linguistic analysis of the received input message to identify the subject matter, and the nature of any input from the correspondent (170). However, matching may be performed according to any criteria, such as the presence of keywords. In the context of FAQ, it will often be useful to fuzzy match every input to a library of frequently asked questions. The matching process is ordered, but may be reordered dynamically during a conversation. For instance, at the beginning of a new conversation the process may be ordered so that a selection is made from a high level menu of options. During conversation however, the process may be ordered to search all the nodes downstream of the current node. This matching step is performed by reference to the Conversational Thesaurus (134) and Translations Dictionary (136) in the chatbot database (130).

Input messages and outputs by the chatbot may be in textual or non-textual form, and may be an explicit statement or unstructured content or activity. For example, an input message can include questions and comments typed into a user interface by the correspondent, items clicked on in the chat interface, other types of online activity such as clicking of links on a website, clicking or tabbing to fields in a online form, or other type of activity where inputs are sent via an external device to the chatbot (e.g. turning on a light in a building; speaking instructions to a system that controls aspects of a building such as air conditioning; depressing the lerator on a vehicle; requesting information of a satellite navigation system). Outputs by the chatbot can be text, or an animation like smiling, or loading a document, or an action if the chatbot is in a machine, or other activities.

The interpretation engine (112) also determines whether the correspondent's profile needs to be updated according profile update rules for that Input Node created using the Profile Update Rules View in FIG. 12; step 364 and 366.

If the current node is an Output Node (O), the interpretation engine (112) will display the output message stored with this node; see step 370 in FIG. 16.

If the current node is a Base Personality Response Node (B), the interpretation engine (112) wilt respond with content front the base personality of the chatbot; see stop 372 in FIG. 16.

If the current node is a Profile Check Node (P), the interpretation engine (112) will perform a conditional check on the correspondent's profile. If all conditions are satisfied, the interpretation engine (112) will process the top child node extending from the current node; step 374 in FIG. 16. In the example in FIG. 9, the Profile Check Node (236) directs the engine (112) to check whether the correspondent's profile has a ":yes" value for the profile variable "Investor". If it does, the engine navigates to its top child node (238).

If the current node is a GoTo Node (G'), the interpretation engine (112) will to jump to a different node, specified by the GoTo Node, and process that new node; see step 376 in FIG. 16. In the example in FIG. 9, the GoTo Node (238) directs the engine (112) to an Output Node (240) in another folder.

If the current node is a Check Node (C), the interpretation engine (112) will attempt to match a correspondent's input message with Input Nodes stored in a folder specified by the Check Node; see step 378 in FIG. 16. In the example in FIG. 2, the interpretation engine (112) will attempt to match an input message with Input Nodes in the "Credit Cards"; "Home Loans"; "Insurance"; "Internet Banking"; "Account Balance"; "General BNK/bank Questions"; and "General" folders. For example, a bank may have a folder of "new questions users are asking you, awaiting approval from your legal team." The questions and answers are in the conversation data structure of the chatbot but the chatbot is instructed to check whether the answers are approved before outputting them to the correspondent. Another example is, lets say a user has bought a complicated piece of equipment and deeds help setting it up. The chatbot has two possible conversation paths: one for advanced users, one for less-advanced users. The chatbot may profile the correspondent as a less-advanced user and is instructed to ONLY check the folder for less-advanced users, and ignore folders with advanced user information.

If the current node is a Random Node (R), the interpretation engine (112) will select a child node extending from the Random Node randomly and processes the selected child node; see step 380 in FIG. 16, If the current node is a Default Node (D), the interpretation engine (112) will process the top child node extending from the Default Node; see step 382 in FIG. 16.

The direction a conversation takes depends on the structure and design of the conversation data structure. Typically a conversation path will navigate through a series of nodes which may involve, at respective nodes, matching the correspondent's input message, performing an action, reporting information to the correspondent, and waiting for further input when a Get User Input Node (G) is encountered. This sequence may repeat many times before a conversation path is exhausted. While the conversation path is generally unidirectional, there may be occasions where it is necessary to loop back.

The conversation path may also include many branches which may or may not be used depending upon the input from the correspondent. Each Profile Check (P), Check Node (C) and Get User Input (G) represents a conditional branch, and the chatbot can vary the path depending on what the user says. This allows the chatbot to personalise a conversation with a correspondent rather than simply providing flat, single answers to a single FAQ.

There will be instances where a correspondent's input cannot be matched to any of the Input Nodes (I). A user can plan for such instances by adding one or more GoTo (G'), Check (C), Base Personality Response (B) and Default (D) Nodes to instruct the interpretation engine (112) to go to a specific branch, to search for Input Nodes (I) in other folders, to respond based on its base personality or to provide a default message to the correspondent respectively.

A Base Personality Response Node (B) can also be added to animate the chatbot at the beginning or during a conversation.

Fuzzy Search and Automatic Learning

Often, in a conversation with a chatbot, a person will encounter a segment in the conversation where the chatbot does not understand what they said. There is an automated facility for handling this situation to extract the correct and matching response from the user and moving the conversation on the next point.

When no match can be found for the correspondent's input message, a fuzzy search is performed to determine one or more nodes in the conversation data structure that are approximate matches to the received input message. And if fuzzy matching Input nodes can be found, these are presented in a list to the correspondent. If the correspondent selects one of the suggested Inputs nodes from the list, the correspondent's input message is associated with the Input node. Internally, this process results in the generation of learning pairs:

<Correspondent's ambiguous input message><Correspondent's selected accurate input message>

These pairs are learning data that the interpretation engine (112) uses to automatically improve its own knowledge base. Example of how an ambiguous input is matched with an accurate input is as follows;

Correspondent: Can I go swimming near here in the ocean?

Chatbot: I'm not sure if I understand you properly. Do you mean one of the following?
1. Where are beaches I can swim that are close by?
2. When is the weather good for swimming?
3. Where can kids swim?

Correspondent: 1

Chatbot: The best place to swim is at Beacon's beach.

If the correspondent chooses one of the above as a match, the chatbot will record the received input message as a variation to a known input message that matches the node chosen by the correspondent. In this case, the ambiguous input, "Can I go swimming near here in the ocean?", is mapped to "Where are beaches I can swim that are close by?". The learned input-variation pair can be viewed by the user in the Auto Learn Input View (210); see FIG. 5. Various actions can be performed using the correspondent's input message: it can be permanently associated with the Input node selected by the correspondent, it can be permanently associated with a different Input node selected by an human editor, it can be used to0 create a new Input node, it can be deleted.

Application Programming Interface (API)

There are two ways in which the API may be used to integrate its functionality into an application or website: HTTP API and JavaScript API.

API

A HTTP API allows users to develop their own fully customised front-end chat window. This front end user interface can communicate with the chat platform supported by the chatbot server (110) via HTTP calls, sending input and receiving responses.

HTTP API is a developer's interface into the functionality of chatbot server (110). It allows for the development of custom third party user-interfaces and applications that can talk to the chatbot server (110) to provide chat functionality. HTTP API allows easy integration of the chat functionality provided by the chatbot server (110) in a straight forward, effective way. The only requirement is for the application to have the ability to make HTTP requests and parse the response returned from the chatbot server (110).

JavaScript API allows integration with an existing MyCyberTwin chat window. In this case, a user is only required to insert a couple of lines of HTML and JavaScript code into a web page or application to allow a correspondent to access a chatbot. It is sometimes necessary to send silent messages to the chatbot server (110). A silent message is not recorded as part of the conversation, but triggers a response from the chatbot. Silent messages are typically used to get the chatbot to respond to a correspondent's actions rather than an input text. For example, a silent message may be generated and sent to the chatbot server (110) when a correspondent clicks on a form provided on a web page. An input message can be made silent using tag "<silent>1</silent>", and in this case, silent message "<silent>1</silent> what is this application form about?" is sent to the chatbot server (110) to trigger a response.

Statistics Collection

The chatflow application (114) also has the ability to generate statistics from conversational history between the chatbot and correspondents. There are three types of statistics: chat statistics (see FIG. 18(a)) and user input statistics (FIG. 18(b)), and profile reports. Chat statistics report details on how many messages and the timing of the message where as user input statistics report on what people have been saying to the chatbot. A user can generate statistics on either by simply specifying a date range. Profile reports are reports on the correspondents scores against particular profile variables, either on their own or in combination with other variables or reports. These profile reports can be generated for an individual correspondents, or for aggregated groups of correspondents.

One or more reports summarising the conversations between the chatbot and one or more correspondents. The reports may include one or more of:
- statistics about the number of nodes selected for processing;
- statistics about the number of times each node was selected for processing;
- the exact words used in correspondents input messages;
- the number of input messages that matched to the default node;
- which nodes have been selected by a correspondent after a fuzzy search has been performed and the input messages that have been associated with the node as a result;
- profile reports on individual correspondents, groups of correspondents, and nodes in the conversation data structure;
- the number of times correspondents engaged in specific processes with the chatbot;
- the number of times correspondents completed certain processes with the chatbot, in combination with reports about various profile variables
- statistics about the number of input and output messages;
- statistics about the number of conversations; and
- statistics about time spent in conversation.

Advantageously, the chatbot described here functions with more human-like intelligence. For example, if the correspondent asks a question that cannot be matched to a known question, or asks an ambiguous question, the chatbot can perform a search for the closest ranking match and present the answer to the correspondent, or autonomously decide on the best answer using a detailed profile of the correspondent. The chatbot described here can also direct the correspondent down a long conversation path with conditional branching, not just simple answer to known correspondent question. The chatbot has to interpret the question, draw conclusions about the correspondent's intentions, or react interactively to elicit more information until enough information has been assembled for it to answer.

The chatbot offers way to tailor the information to suit the correspondent, and provides a mechanism for dynamically responding to in-depth information about correspondents' behaviour, intentions and interests and other profile characteristics. The chatbot described here provides mechanisms that enable the tailoring of the chatbot's responses depending on information gathered about the correspondent, so that the conversation is highly personalised. The chatbot described here also provides a mechanism for detailed reporting about a correspondent using information gathered during a conversation.

It will be appreciated by persons skilled in the art that numerous variations and/or modifications may be made to the invention as shown in the specific embodiment without departing from the scope of the invention as broadly described. The present embodiments are, therefore, to be considered in all respects as illustrative and not restrictive.

For example, the chatbot functionality is not limited to the FAQ space and can be applied in many other contexts. For instance, the chatbot may be associated with an avatar in a virtual world and used to engage in conversations with real people or other avatars in the virtual world, or they may be present in a personal companion robot, or a machine or mobile device.

Claims defining the invention are as follow:

1. A computer-implemented method for conducting an automated conversation with a correspondent, the method comprising:
    providing at least one database comprising a plurality of conversation nodes of different types, configured into a plurality of conversation paths, each conversation path comprising more than one conversation node linked together to form the conversation path, the more than one conversation nodes comprising nodes coded with instructions that are processed to instruct an interpretation engine to perform an operation as part of the conversation path, and a correspondent profile comprising a plurality of profile variables specifying personal attributes of the correspondent that are specific to a domain of the plurality of conversation paths;
    initiating a conversation with the correspondent based on the plurality of conversation paths stored in the at least one database;
    processing first instructions and information both coded in a first conversation node, in a set of conversation nodes of a conversation path in the plurality of conversation paths, that output a message to the correspondent;
    processing second instructions and information both coded in a second conversation node, in the set of conversation nodes of the conversation path, that receive an input message from the correspondent in response to the message output by the processing of the first instructions and information coded in the first conversation node;
    processing third instructions and information both coded in at least one third conversation node, in the set of conversation nodes of the conversation path, that analyze the response from the correspondent with regard to one or more criteria associated with the at least one third conversation node to determine and select a successive conversation node along the conversation path, wherein the at least one third conversation node comprises a correspondent profile check node having at least one instruction that selects the successive conversation node based on a match of a profile variable setting in the correspondent profile to a criteria associated with the correspondent profile check node; and
    dynamically updating settings of the profile variables in the correspondent profile based on results of analyzing the response from the correspondent.

2. The computer-implemented method of claim 1, wherein the successive conversation node comprises at least one of the following:
    an output node comprising coded instructions and information to output a message to the correspondent,
    an input node comprising coded information representing a recognized input in response to an output generated by an output node, a get user input node comprising coded instructions and information for matching an input from the correspondent to an input node, a base personality response node comprising coded instructions and information for responding to an input from the correspondent using a base personality content of a pre-trained base personality chatbot, a profile check node comprising coded instructions and information for performing a conditional check of at least one profile variable of the plurality of profile variables against one or more correspondent profile criteria, a goto node comprising coded instructions and information to branch a conversation to another conversation node in a same or a different conversation path, a check node comprising coded instructions and information to check a latest input from the correspondent against input nodes within a given folder and select a best ranked input node based on results of the check, a random node comprising coded instructions and information to select a child node in the conversation path randomly and continue the conversation from the randomly selected child node, or a default node comprising coded information to match to any input from the correspondent when a matching input node cannot be found.

3. The computer-implemented method of claim 1, wherein processing the third instructions and information coded in the at least one third conversation node further comprises attempting to match the received input message with content of a conversational thesaurus.

4. The computer-implemented method of claim 1, wherein determining and selecting a successive conversation node along the conversation path comprises:

attempting to match the input message to content of one or more input conversation nodes of the conversation path, in response to a matched input conversation node being found, selecting the matched input conversation node as the successive conversation node for processing to thereby generate a selected conversation node;

in response to a matched input conversation node not being found, selecting another conversation node of the conversation path for processing using a fuzzy search to thereby generate a selected conversation node; and processing the selected conversation node to follow the conversation path based at least in part on coded instructions and/or relationships of the selected conversation node with one or more other conversation nodes of the conversation path.

5. The computer-implemented method of claim 4, wherein selecting another conversation node of the conversation path for processing the fuzzy search further comprises using a default procedure that comprises presenting statements to the correspondent which the correspondent is able to select and updating processing of the fuzzy search based at least in part on a selection by the correspondent of a presented statement.

6. The computer-implemented method of claim 1, further comprising:

evaluating text in responses from the correspondent to determine a preferred manner by which to deliver information to the correspondent; and presenting information output to the correspondent in the preferred manner.

7. The computer-implemented method of claim 1, wherein the plurality of conversation paths comprise a domain specific chatbot that operates in conjunction with a base personality chatbot that is common to a plurality of domain specific chatbots.

8. The computer-implemented method of claim 7, wherein processing the first, second, and third instructions and information coded in the first, second, and at least one third conversation nodes, respectively, comprises navigating, by the interpretation engine, from one conversation node to another along one or more of the conversation paths in the plurality of conversation paths.

9. The computer-implemented method of claim 8, wherein the interpretation engine automatically updates a conversational thesaurus data structure and translation dictionary data structure based on learned variations of terms in input received from the correspondent during processing of the conversation path, wherein the conversational thesaurus and translation dictionary data structures are common to the base personality chatbot and plurality of domain specific chatbots.

10. The computer-implemented method of claim 8, wherein the at least one third conversation node comprises a check conversation node, and wherein processing the third instructions and information coded in the at least one third conversation node comprises the interpretation engine performing an operation associated with the check conversation node to match the input message from the correspondent to an input conversation node in a plurality of input conversation nodes linked to the check conversation node.

11. The computer-implemented method of claim 1, wherein:

processing the first, second, and third instructions and information coded in the first, second, and at least one third conversation nodes, respectively, comprises navigating, by the interpretation engine, from one conversation node to another along one or more of the conversation paths in the plurality of conversation paths, the at least one third conversation node comprises a character string length criteria, and matching the input message to the character string length criteria results in an output of a message sent to the correspondent informing the correspondent that the interpretation engine is a robot.

12. The computer-implemented method of claim 1, wherein providing at least one database comprising a plurality of conversation nodes of different types, configured into a plurality of conversation paths comprises:

presenting a graphical user interface for defining at least one conversation path in the plurality of conversation paths; and receiving, via the graphical user interface, a user input selecting objects representing conversation nodes of the at least one conversation path and linking the objects into a set of objects and links representing the at least one conversation path.

13. The computer-implemented method of claim 12, wherein the graphical user interface comprises a first portion representing a hierarchical representation of the plurality of conversation nodes of the conversation path and a second portion representing details of a GUI selected conversation node in the plurality of conversation nodes.

14. The computer-implemented method of claim 13, wherein:

in response to the GUI selected conversation node being an output conversation node, presenting details in the second portion, wherein the details represented in the second portion comprise a preview of an output corresponding to the output conversation node, in response to the GUI selected conversation node being an input conversation node, presenting details in the second portion, wherein the details represented in the second portion comprise alternative terms or phrases for a primary term or phrase of the input conversation node, and in response to the GUI selected conversation node being a profile check conversation node, presenting details in the second portion, wherein the details represented in the second portion comprise one or more variables and corresponding values to the one or more variables indicative of the profile check conversation node being matched by a correspondent profile.

15. The computer-implemented method of claim 1, wherein providing at least one database comprising a plurality of conversation nodes of different types, configured into a plurality of conversation paths comprises:
receiving an input data structure comprising questions and corresponding answers;
executing a dynamic knowledge learning operation on the input data structure to learn key relationships between terms and concepts specified in the questions and corresponding answers; and
automatically generating variations of input conversation nodes based on the learned key relationships.

16. A computer-implemented method for conducting an automated conversation with a correspondent, the method comprising:
providing at least one database comprising a plurality of conversation nodes of different types, configured into a plurality of conversation paths, each conversation path comprising more than one conversation node linked together to form the conversation path, and a correspondent profile comprising a plurality of profile variables specifying personal attributes of the correspondent that are specific to a domain of the plurality of conversation paths;
initiating a conversation with the correspondent based on the plurality of conversation paths stored in the at least one database;
processing information coded in a first conversation node, in a set of conversation nodes of a conversation path in the plurality of conversation paths, to output a message to the correspondent;
processing information coded in a second conversation node, in the set of conversation nodes of the conversation path, to receive an input message from the correspondent in response to the message output by the processing of the information coded in the first conversation node;
processing information coded in at least one third conversation node, in the set of conversation nodes of the conversation path, to analyze the response from the correspondent with regard to one or more criteria associated with the at least one third conversation node to determine and select a successive conversation node along the conversation path, wherein the at least one third conversation node comprises a correspondent profile check node that selects the successive conversation node based on a match of a profile variable setting in the correspondent profile to a criteria associated with the correspondent profile check node; and
dynamically updating settings of the profile variables in the correspondent profile based on results of analyzing the response from the correspondent, wherein:
processing information coded in the first, second, and at least one third conversation nodes comprises navigating, by an interpretation engine, from one conversation node to another along one or more of the conversation paths in the plurality of conversation paths,
the at least one third conversation node comprises a check conversation node, processing information coded in the at least one third conversation node comprises the interpretation engine performing an operation associated with the check conversation node to match the input message from the correspondent to an input conversation node in a plurality of input conversation nodes linked to the check conversation node, and
in response to the interpretation engine performing the operation associated with the check conversation node resulting in no match with an input conversation node, processing information coded in the at least one third conversation node further comprises:
performing a fuzzy matching search of input conversation nodes to identify one or more possible input conversation nodes as potential matches to the input message;
presenting the one or more possible input conversation nodes to the correspondent; and
receiving an input from the correspondent indicating a selected input conversation node from the one or more possible input conversation nodes.

17. The computer-implemented method of claim 16, further comprising:
generating a learning pair comprising an association of the selected input conversation node with the input message; and
performing machine learning of the association of the selected input conversation node with the input message based on the learning pair.

18. The computer-implemented method of claim 17, wherein performing machine learning of the association comprises storing the input message as an alternative matching input message for the selected input conversation node.

19. A computer program product comprising a non-transitory computer readable medium having a computer readable program stored thereon, wherein the computer readable program, when executed by a computing device, causes the computing device to:
access at least one database comprising a plurality of conversation nodes of different types, configured into a plurality of conversation paths, each conversation path comprising more than one conversation node linked together to form the conversation path, the more than one conversation nodes comprising nodes coded with instructions that are processed to instruct an interpretation engine to perform an operation as part of the conversation path, and a correspondent profile comprising a plurality of profile variables specifying personal attributes of the correspondent that are specific to a domain of the plurality of conversation paths;
initiate a conversation with the correspondent based on the plurality of conversation paths stored in the at least one database;
process first instructions and information both coded in a first conversation node, in a set of conversation nodes of a conversation path in the plurality of conversation paths, that output a message to the correspondent;
process second instructions and information both coded in a second conversation node, in the set of conversation nodes of the conversation path, that receive an input message from the correspondent in response to the message output by the processing of the first instructions and information coded in the first conversation node;
process third instructions and information both coded in at least one third conversation node, in the set of conversation nodes of the conversation path, that analyze the response from the correspondent with regard to one or more criteria associated with the at least one third conversation node to determine and select a successive conversation node along the conversation path, wherein the at least one third conversation node comprises a correspondent profile check node having at least one instruction that selects the successive conversation node based on a match of a profile variable setting in the correspondent profile to a criteria associated with the correspondent profile check node; and dynamically update settings of the profile variables in the correspondent profile based on results of analyzing the response from the correspondent.

20. A data processing system, comprising:

a database system providing at least one database comprising a plurality of conversation nodes of different types, configured into a plurality of conversation paths, each conversation path comprising more than one conversation node linked together to form the conversation path, the more than one conversation nodes comprising nodes coded with instructions that are processed to instruct an interpretation engine to perform an operation as part of the conversation path, and a correspondent profile comprising a plurality of profile variables specifying personal attributes of the correspondent that are specific to a domain of the plurality of conversation paths; and at least one processor configured by computer readable instructions stored in at least one memory, the computer readable instructions, when executed by the at least one processor, cause the at least one processor to:

initiate a conversation with the correspondent based on the plurality of conversation paths stored in the at least one database;

process first instructions and information both coded in a first conversation node, in a set of conversation nodes of a conversation path in the plurality of conversation paths, that output a message to the correspondent;

process second instructions and information both coded in a second conversation node, in the set of conversation nodes of the conversation path, that receive an input message from the correspondent in response to the message output by the processing of the first instructions and information coded in the first conversation node;

process third instructions and information both coded in at least one third conversation node, in the set of conversation nodes of the conversation path, that analyze the response from the correspondent with regard to one or more criteria associated with the at least one third conversation node to determine and select a successive conversation node along the conversation path, wherein the at least one third conversation node comprises a correspondent profile check node having at least one instruction that selects the successive conversation node based on a match of a profile variable setting in the correspondent profile to a criteria associated with the correspondent profile check node; and dynamically update settings of the profile variables in the correspondent profile based on results of analyzing the response from the correspondent.

* * * * *